US009415737B2

(12) United States Patent
Iguchi et al.

(10) Patent No.: US 9,415,737 B2
(45) Date of Patent: Aug. 16, 2016

(54) VEHICLE OCCUPANT PROTECTION DEVICE
(71) Applicant: DENSO CORPORATION, Kariya, Aichi-pref. (JP)
(72) Inventors: Yuuki Iguchi, Kariya (JP); Hiroshi Higuchi, Kariya (JP); Hisashi Takahashi, Anjo (JP); Hiroyoshi Takeuchi, Kariya (JP)
(73) Assignee: DENSO CORPORATION, Kariya, Aichi-pref. (JP)
( * ) Notice: Subject to any disclaimer, the term of this patent is extended or adjusted under 35 U.S.C. 154(b) by 0 days.
(21) Appl. No.: 14/644,578
(22) Filed: Mar. 11, 2015
(65) Prior Publication Data
US 2015/0274108 A1 Oct. 1, 2015
(30) Foreign Application Priority Data

Mar. 26, 2014 (JP) ................................. 2014-063577
Jan. 15, 2015 (JP) ................................. 2015-005954

(51) Int. Cl.
*B60R 21/0132* (2006.01)
*B60R 21/0134* (2006.01)
*B60R 21/0136* (2006.01)
(52) U.S. Cl.
CPC ......... *B60R 21/0132* (2013.01); *B60R 21/0134* (2013.01); *B60R 21/0136* (2013.01); *B60R 2021/01322* (2013.01); *B60R 2021/01327* (2013.01)
(58) Field of Classification Search
CPC ............ B60R 21/0132; B60R 21/0134; B60R 21/0136; B60R 2021/0009; B60R 2021/0023; B60R 2021/01322; B60R 2021/01327
See application file for complete search history.

(56) References Cited

U.S. PATENT DOCUMENTS

| 5,229,943 | A | * | 7/1993 | Eigler | ................. | B60R 21/0132 |
| | | | | | | 180/282 |
| 5,424,583 | A | * | 6/1995 | Spies | ...................... | G01P 15/08 |
| | | | | | | 180/282 |
| RE36,122 | E | * | 3/1999 | Mattes | ................ | B60R 21/0132 |
| | | | | | | 180/268 |
| 5,900,807 | A | * | 5/1999 | Moriyama | .......... | B60R 21/0132 |
| | | | | | | 180/282 |
| 5,936,549 | A | * | 8/1999 | Tsuchiya | .............. | B60R 21/013 |
| | | | | | | 340/436 |
| 6,198,387 | B1 | * | 3/2001 | Dalum | ................ | B60R 21/0132 |
| | | | | | | 180/282 |
| 6,748,307 | B1 | * | 6/2004 | Sala | ..................... | B60R 21/0132 |
| | | | | | | 280/734 |
| 7,031,815 | B2 | * | 4/2006 | Imai | .................... | B60R 21/0132 |
| | | | | | | 180/282 |
| 7,925,403 | B2 | * | 4/2011 | Kumagai | ............ | B60R 21/0134 |
| | | | | | | 180/271 |
| 2006/0192370 | A1 | | 8/2006 | Abe et al. | | |

FOREIGN PATENT DOCUMENTS

| JP | 2009-096394 | 5/2009 |
| JP | 2013-173404 | 9/2013 |

* cited by examiner

*Primary Examiner* — Laura Freedman
(74) *Attorney, Agent, or Firm* — Harness, Dickey & Pierce, P.L.C.

(57) ABSTRACT

An airbag controller in a vehicle occupant protection device deploys airbags when one of a front-right acceleration sensor and a front-left acceleration sensor disposed on a front face of a vehicle detects an over-threshold acceleration exceeding a front threshold and one of a side-right acceleration sensor or a side-left acceleration sensor, which are disposed on a side face of the vehicle, detects an over-threshold acceleration exceeding a lateral threshold. A threshold acceleration storage device stores the front threshold and plural lateral thresholds that have respectively different values. An image processor processes image data from an in-vehicle camera and calculates the offset rate, an offset direction, a collision angle, a collision direction, and a relative speed at a timing just-before an offset collision between a subject vehicle and another vehicle. Based on a detection result, the airbag controller selects one of the plural lateral thresholds stored in the storage device.

13 Claims, 12 Drawing Sheets

VEHICLE OCCUPANT PROTECTION DEVICE

CROSS REFERENCE TO RELATED APPLICATION

The present application is based on and claims the benefit of priority of Japanese Patent Applications No. 2014-063577, filed on Mar. 26, 2014, and No. 2015-5954, filed on Jan. 15, 2015, the disclosure of which are incorporated herein by reference.

TECHNICAL FIELD

The present disclosure generally relates to a vehicle occupant protection device for protecting vehicle occupants in an emergency situation, such as an accident or the like.

BACKGROUND INFORMATION

A conventional technique for operating an occupant protection device in a vehicle is configured in the following manner, according to the disclosure of a patent document 1 (i.e., JP-A-2009-96394), for example. That is, in such technique, a vehicle body crash amount is estimated in a vehicle collision based on the collision type, and then a calculation of kinetic energy of an occupant in the vehicle is performed based on a weight of the occupant and a vehicle speed at the time of collision. Also, a calculation of an occupant retain force for retaining the occupant is performed based on a final vehicle body crash amount, the kinetic energy of the occupant, a current amount of the crash of the vehicle body and a distance between the occupant and a vehicle interior, for the operation of an occupant protection unit of the occupant protection device. Such an occupant protection device retains the occupant according to a collision state of the vehicle, i.e., a collision direction, a collision part, a collision speed and the like, thereby enabling and providing an appropriate occupant protection for the occupant of the vehicle.

An offset collision is one of many forms of a head-on collision. Many vehicle occupant protection devices have been proposed for protecting the occupant from, such a collision. The offset collision is a collision in which a portion of a vehicle front face collides with another vehicle or an obstacle. In one aspect, the offset collision has a slightly longer collision time than a full-width collision, causing an impact of the collision mitigated in the course of crash of the vehicle body. However, the impact of the offset collision is concentrated to a small portion of the vehicle body, thereby making the offset collision more dangerous than other forms of collisions because the cabin space for the occupant in the vehicle may collapse in the offset collision. For coping with the dangerousness of the offset collision, many vehicle body structures have been proposed, in which the impact of the offset collision of the vehicle is diverted from a smaller portion to other parts for keeping the vehicle compartment (i.e., the cabin space of the occupant) intact.

However, the hazards to the vehicle occupant in the offset collision are not limited to the above-described crash and resultant decrease of cabin space. That is, the vehicle in the offset collision has an angular moment, which causes a spin of the vehicle body. Particularly, when the vehicle is in a small overlap collision (i.e., Small Overlap Impact, or SOI) in which an amount of overlap between the own vehicle and an obstacle is small, a rotation speed and a rotation angle of the vehicle body are high. Therefore, to prevent such a hazard, an occupant protection device such as a side airbag, a curtain airbag and the like have been proposed, for the improved protection of the occupant in such a collision.

Normally, the side airbag is operated, i.e., deployed, when a side acceleration or a front-rear acceleration caused by the impact in the collision is equal to or greater than a preset threshold. However, the offset collision makes it difficult to accurately predict the rotation direction and the rotation speed of the vehicle, based only on the impact that is picked up/input by the impact detection sensors on various parts of the vehicle at an early stage of the collision. In view of such a situation, the interior members and surfaces of the vehicle are changed to a non-damaging, soft material and structure for protecting the body of the occupant and/or reducing the injury of the occupant. Further, for preventing the occupant from being thrown out of the vehicle at the time of the vehicle collision, the use of the seat belt has been advised for the vehicle occupants including rear seat passengers (i.e., mandated in Japan).

SUMMARY

It is an object of the present disclosure to provide a vehicle occupant protection device that is capable of providing an improved protection capability for protecting an occupant in an offset collision of a vehicle.

In an aspect of the present disclosure, the vehicle occupant protection device includes a front-rear impact magnitude detector detecting a magnitude of an impact of a vehicle along a front-rear direction of the vehicle, a right-left impact magnitude detector detecting a magnitude of an impact of the vehicle along a right-left direction of the vehicle, and an occupant protector protecting a body of an occupant from impact with the vehicle. The vehicle occupant protection device also includes a protection controller operating the occupant protector when an over-threshold impact is detected by the front-rear impact magnitude detector or the right-left impact magnitude detector, a right-left threshold storage storing plural lateral thresholds for operating the occupant protector based on the magnitude of the impact detected by the right-left impact magnitude detector, and an offset level detector detecting a level of an offset collision when an obstacle collides with a front portion of the vehicle. The protection controller selects one of the plural lateral thresholds stored in the right-left threshold storage based on the level of the offset collision detected by the offset level detector.

In another aspect of the present disclosure, each of the plural lateral thresholds is a threshold used to detect rotation of the vehicle.

In yet another aspect of the present disclosure, each of the plural lateral thresholds is a threshold used to detect rotation of the vehicle that is caused by a small overlap collision.

Further, in an aspect of the present disclosure, the protection controller selects one of the plural lateral thresholds stored in the right-left threshold storage based on the level of the offset collision which is derived from (i) an overlap ratio that is defined as an overlap amount between the vehicle and the obstacle in the offset collision divided by a width of the vehicle, and (ii) a relative speed of the vehicle relative to the obstacle.

Additionally, in an aspect of the present disclosure, the protection controller selects one of the plural lateral thresholds stored in the right-left threshold storage based on the level of the offset collision which is derived from (i) a colliding angle between the vehicle and the obstacle, and (ii) a relative speed of the vehicle relative to the obstacle.

Moreover, in an aspect of the present disclosure, the protection controller operates the occupant protector when both the front-rear impact magnitude detector and the right-left impact magnitude detector detect an over-threshold impact.

Still further, in an aspect of the present disclosure, the protection controller selects one of the plural lateral thresholds stored in the right-left threshold storage based on the level of the offset collision detected by the offset level detector, the detection of the level of the offset collision being detected at a prior-to-collision timing, the prior-to-collision timing being defined as a time prior to the collision of the vehicle with the obstacle.

Even further, in an aspect of the present disclosure, the protection controller invalidates a collision start determination when the level of the offset collision detected by the offset level detector indicates that the vehicle is not involved in a collision, and the protection controller prohibits selecting one of the plural lateral thresholds based on the level of the offset collision detected by the offset level detector.

Also, in an aspect of the present disclosure, the offset level detector includes an obstacle detector disposed in the vehicle and that detects an approach of the obstacle toward the vehicle while the obstacle is in a non-contact state with the vehicle.

In another aspect of the present disclosure, the occupant protector includes plural airbags, and the protection controller selects and operates one or more of the plural airbags based on the level of the offset collision detected by the offset level detector.

In still another aspect of the present disclosure, the airbags include curtain airbags, the protection controller operates the curtain airbags only when the level of the offset collision detected by the offset level detector is less than a first preset value, and the protection controller operates at least one other airbag in addition to the curtain airbags when the level of the offset collision detected by the offset level detector is equal to or greater than the first preset value.

In a further aspect of the present disclosure, the airbags are disposed symmetrically in pairs on a right-side position and a left-side position in the vehicle compartment, the protection controller operates the airbags that are disposed on an opposite side, that is opposite to a rotation direction of the vehicle along a right-left direction, when the level of the offset collision detected by the offset level detector is less than a second preset value, and the protection controller operates the airbags that are disposed on the opposite side, that is opposite to a rotation direction of the vehicle along a right-left direction, and subsequently operates the airbags that are disposed on a side of the rotation direction of the vehicle when the level of the offset collision detected by the offset level detector is equal to or greater than the second preset value.

Still further, in an aspect of the present disclosure, the protection controller determines that a collision of the vehicle has a level of rotation for which operation of the occupant protector is not needed when the level of the offset collision detected by the offset level detector is less than a third preset value, an initial value is configured as one of the lateral thresholds that is selected when the protection controller determines that the collision of the vehicle has the level of rotation for which operation of the occupant protector is not needed, and the initial value is set to a greater value that is greater than all other lateral thresholds.

According to the above-described configuration, the protection controller may be able to select a smaller threshold value from among the plural lateral thresholds stored in the right-left threshold storage, based on the level of the offset collision detected by the offset level detector, i.e., based on a (pre-crash) prediction that the rotation angle of the vehicle body is great in view of the level of the offset collision. Therefore, the offset collision in which the right-left impact magnitude detected by the right-left impact magnitude detector tends to be smaller than a fixed and predetermined threshold value is appropriately evaluated and handled, for the operation of the occupant protector and for sufficient protection of the occupant in the vehicle.

Further, the rotation of the vehicle is predicted at an early stage in the collision based on the level of the offset collision, the vehicle occupant protection device can appropriately protect the occupant from the damage/injury caused by the rotation of the vehicle.

In the present disclosure, the "level of the offset collision" is, for example, a concept or an index that is used to predict the rotation angle/speed of the spinning vehicle body in the offset collision, which means that the higher the level of the offset collision, the greater the rotation angle/speed would be in such a collision, and that the lower the level of the offset collision, the smaller the rotation angle/speed would be in such a collision.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Based on FIGS. 1 to 15, a vehicle occupant protection device 1 in one embodiment of the present disclosure is described.

Figure 1:
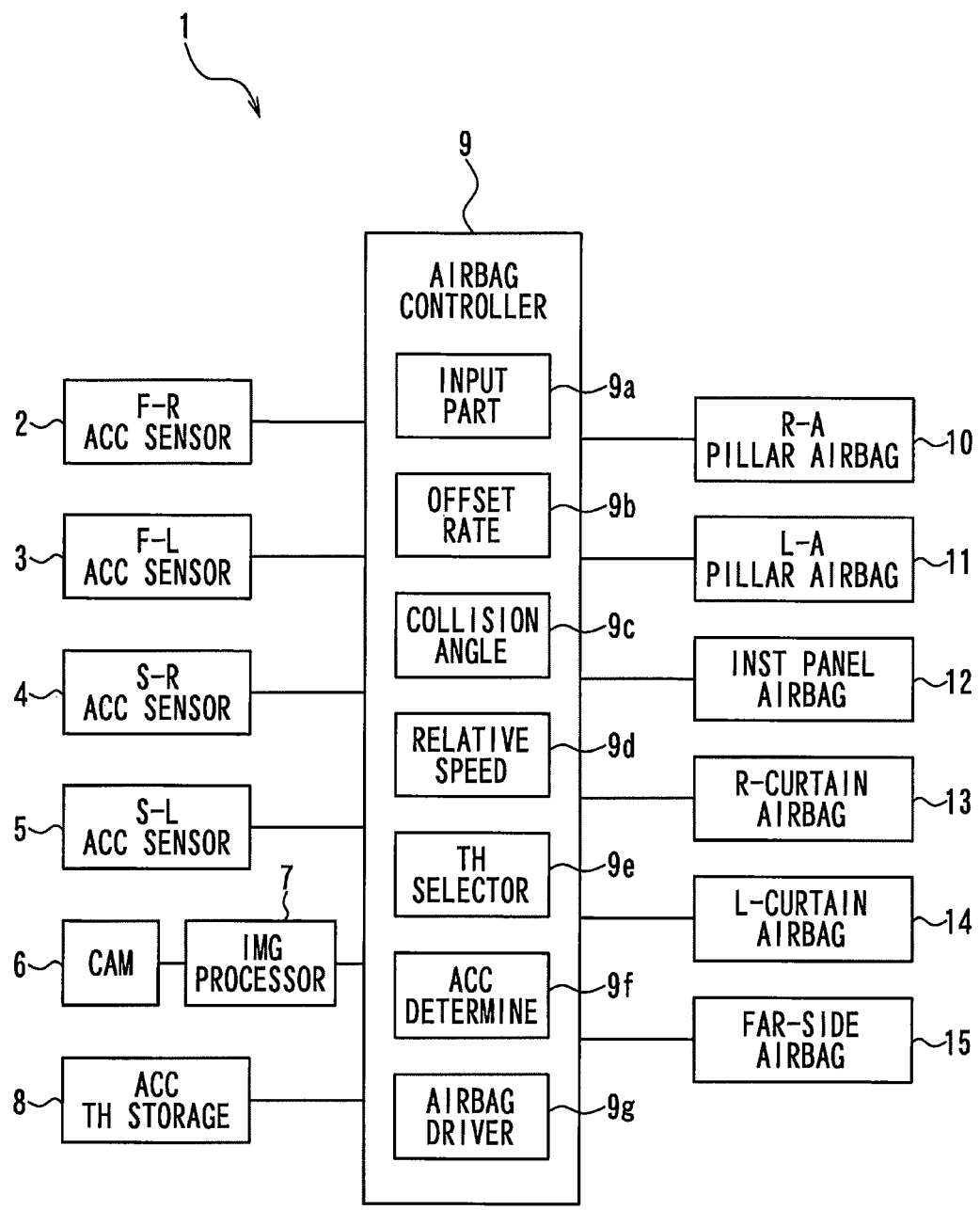
FIG. 1 is a block diagram of a vehicle occupant protection device in one embodiment of the present disclosure.

As shown in FIG. 1, the vehicle occupant protection device 1 in the present embodiment is provided with a front-right acceleration sensor 2, a front-left acceleration sensor 3, a side-right acceleration sensor 4, and a side-left acceleration sensor 5, i.e., is provided with plural acceleration sensors.

Hereafter, these sensors may be collectively designated as acceleration sensors 2-5.

Figure 2:
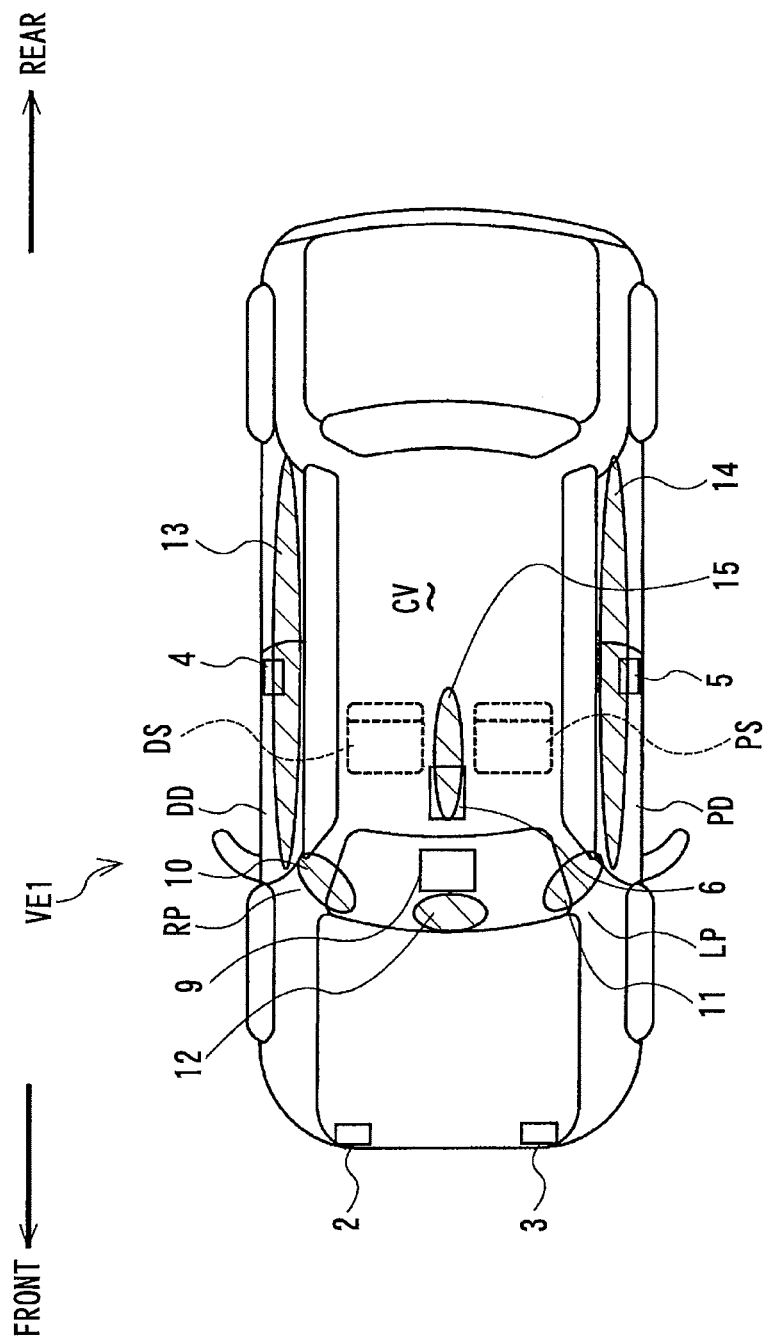
FIG. 2 is a plan view of a vehicle to which the vehicle occupant protection device in FIG. 1 is installed.

As shown in FIG. 2, the front-right acceleration sensor 2 and the front-left acceleration sensor 3 are respectively disposed on the left and right of a front face of a vehicle VE1, and respectively detect the magnitude of the impact along a front-rear direction of the vehicle VE1. The front-right acceleration sensor 2 and the front-left acceleration sensor 3 respectively correspond to a front-rear impact magnitude detector (2, 3) in the claims.

The side-right acceleration sensor 4 and the side-left acceleration sensor 5 are disposed in a driver seat side door DD and in a passenger seat side door PD of the vehicle VE1 respectively, and respectively detect the magnitude of the impact along the lateral direction of the vehicle VE1. The side-right acceleration sensor 4 and the side-left acceleration sensor 5 respectively correspond to a right-left impact magnitude detector (4, 5) in the claims. The position of these sensors 2-5 is not necessarily limited to the front face or the side face of the vehicle VE1, as long as the sensors 2-5 can detect the impact along the front-rear direction or along the right-left direction.

The vehicle occupant protection device 1 is provided with an in-vehicle camera 6 (i.e., an obstacle detector (6) in the claims). The in-vehicle camera 6 is attached to the ceiling part in a vehicle compartment CV, and it is directed to face a front field of the vehicle VE1 so that an outside of the vehicle is captured as shown in FIG. 2. The in-vehicle camera 6 is equipment which can detect an approach of other vehicle VE2 while the vehicle VE1 and the other vehicle VE2 (or other objects, i.e., an obstacle in the claims) are not in contact with each other. Although the in-vehicle camera 6 is implemented as a CCD camera in the present embodiment, the camera 6 may also be a CMOS camera, a MOS camera, an infrared camera, or the like.

An image process arithmetic unit 7 is connected to the in-vehicle camera 6. The image process arithmetic unit 7 detects a relative speed, an offset rate, a collision angle, an offset direction, and a collision direction (to be mentioned later) when an obstacle collides with the front part of the vehicle VE1 in the offset collision based on the image data obtained from the in-vehicle camera 6. How to calculate the relative speed, the offset rate, and the collision angle at the time of offset collision based on the image data of the in-vehicle camera 6 is publicly known as, for example, disclosed in a published patent application of JP-A-2013-173404. Instead of using the image process arithmetic unit 7, a same functional unit may be provided in an airbag controller 9 mentioned later.

The in-vehicle camera 6 and the image process arithmetic unit 7 may correspond to the offset level detector in the claims.

The vehicle occupant protection device 1 is provided with an acceleration threshold value storage device 8 (i.e., a right-left threshold storage (8) in the claims). The acceleration threshold value storage device 8 is implemented either as a hard disk drive unit, an optical disk unit, or a semiconductor memory device, and, as mentioned later, stores plural side-face threshold values LTH0, LTH1, LTH2, LTH3, LTH4, LTH5, LTH6, LTH7, LTH8, LTH9, LTH10, LTH11, LTH12, LTH13, LTH14, LTH15, LTH16, LTH17, LTH18, LTH19, and LTH20 (corresponding to a lateral threshold, respectively, in the claims) which are threshold values of the magnitude of the impact detected by the side-right acceleration sensor 4 and the side-left acceleration sensor 5. Hereafter, these thresholds may also be collectively designated as a lateral threshold value LTH.

The lateral threshold value is a threshold for detecting a rotation of the vehicle VE1, or, more specifically, a threshold for detecting a rotation of the vehicle VE1 caused by a small overlap collision. Although the lateral threshold value LTH usually has respectively different values of impact magnitude, there may be values having the same absolute value and opposite directions in terms of right-left direction of the vehicle VE1.

The airbag controller 9 detects by using the image process arithmetic unit 7 that a level of the offset collision which is described later is equal to or less than a preset rotation determination value (i.e., less than a third preset value in the claims). In such case, the offset collision of the vehicle VE1 is determined as not causing a rotation of the vehicle VE1 which does not require the operation/deployment of airbags 10-15, which are mentioned later. The rotation determination value is a preset threshold for classifying/representing the level of the offset collision, which may be a value lower than first and second preset values mentioned later. One of the lateral threshold values, i.e., an initial value LTH0, is the one that is selected when the rotation of the vehicle VE1 is determined as not requiring the operation of the airbags 10-15. The initial value LTH0 has a value that is greater than all other threshold values LTH1 to LTH20. Further, the acceleration threshold storage device 8 may be configured to also store a front threshold value which is a threshold of the magnitude of the impact along a front-rear direction of the vehicle VE1 which is detected by the front-right acceleration sensor 2 and the front-left acceleration sensor 3.

The acceleration sensors 2-5, the image process arithmetic unit 7, and the acceleration threshold storage device 8 mentioned above are respectively connected to the airbag controller 9 (i.e., a protection controller in the claims). The airbag controller 9 is connected to the following airbags, i.e., to a right windshield post airbag 10 (i.e., Right-A pillar airbag 10), a left windshield post airbag 11 (i.e., Left-A pillar airbag 11), an instrument panel airbag 12, a right curtain airbag 13, a left curtain airbag 14, and a far-side airbag 15. These airbags respectively correspond to the plural airbags in the claims, and may be collectively designated as airbags 10-15.

The airbags 10-15 are disposed in the vehicle compartment CV, and each corresponds to an occupant protector in the claims. The airbags 10-15 are conventional airbags, and are provided with an inflator, a bag, and an igniter (not illustrated). At the time of the collision of the vehicle VE1, the airbags 10-15 protect the vehicle occupant by resisting the impact on the vehicle VE1 and holding/retaining the occupant's body.

As shown in FIG. 2, the right windshield post airbag 10 is accommodated in a right front pillar (i.e., a windshield post) RP of the vehicle VE1, and, if the vehicle is a right-hand steering wheel vehicle, mainly holds/retains the body of the occupant who is sitting on a driver seat DS, and prevents the collision of the occupant's head to the right-front pillar RP at the time of the collision of the vehicle VE1.

The left windshield post airbag 11 is accommodated in a left-front pillar LP of the vehicle VE1, and, in the right-hand steering wheel vehicle, mainly holds the body of the occupant who is sitting on the passenger seat PS, and prevents the collision of the occupant's head to the left-front pillar LP at the time of the collision of the vehicle VE1.

The instrument panel airbag 12 is accommodated in an instrument panel (not illustrated) of the vehicle VE1, and mainly holds the body of the occupant who is sitting on the driver seat DS or the passenger seat PS, and prevents the collision of the occupant's head to the instrument panel at the time of the collision of the vehicle VE1.

The right curtain airbag 13 and the left curtain airbag 14 are accommodated in the right side part and left side part of the vehicle compartment CV, respectively, and, at the time of the collision of the vehicle VE1, mainly holds the body of the occupant in the vehicle compartment CV, and prevents discharge/release of the occupant out of the vehicle.

The far-side airbag 15 is disposed at a position between the driver seat DS and the passenger seat PS, mainly holds the body of the occupant who is sitting on the driver seat DS or the passenger seat PS, and prevents a "cross-release" of the body toward the opposite side, i.e., toward the passenger seat PS or toward the driver seat DS.

The airbag controller 9 mentioned above is a control device that is provided with an input/output device, CPU, RAM, etc. which are not illustrated, and is attached to a bottom of an inside of a dashboard as shown in FIG. 2.

The airbag controller 9 has an input part 9a, an offset rate determination part 9b, a collision angle determination part 9c, a relative speed determination part 9d, a threshold value selecting part 9e, an acceleration determination part 9f, and an airbag driver 9g.

When an over-threshold acceleration is detected by the front-right acceleration sensor 2, the front-left acceleration sensor 3, the side-right acceleration sensor 4, or the side-left acceleration sensor 5, the airbag controller 9 performs a deployment operation of the airbags 10-15 (i.e., a required one or more of those airbags) at an optimal timing.

The image process result from the image process arithmetic unit 7 and the detection signal from the acceleration sensors 2-5 are inputted into the input part 9a. The offset rate determination part 9b and the collision angle determination part 9c respectively perform a preset determination by comparing the calculated offset rate or the collision angle with respectively threshold values, based on the offset direction and the collision direction which are detected by the image process arithmetic unit 7.

The relative speed determination part 9d compares, with a predetermined threshold value, the relative speed calculated by the image process arithmetic unit 7.

The threshold value selecting part 9e selects one of the lateral threshold values LTH stored in the acceleration threshold storage device 8 based on the determination result by the offset rate determination part 9b, the collision angle determination part 9c, and the relative speed determination part 9d. The threshold value selecting part 9e selects, as a lateral threshold value, the initial value LTH0.

The acceleration determination part 9f determines whether to perform the deployment operation of the airbags 10-15 by comparing the detection value from the acceleration sensors 2-5 with the front threshold value stored in the acceleration threshold storage device 8 and with the lateral threshold value LTH chosen by the threshold value selecting part 9e.

The airbag driver 9g performs the deployment operation of the airbags 10-15 based on the determination result by the acceleration determination part 9f.

Figure 3:
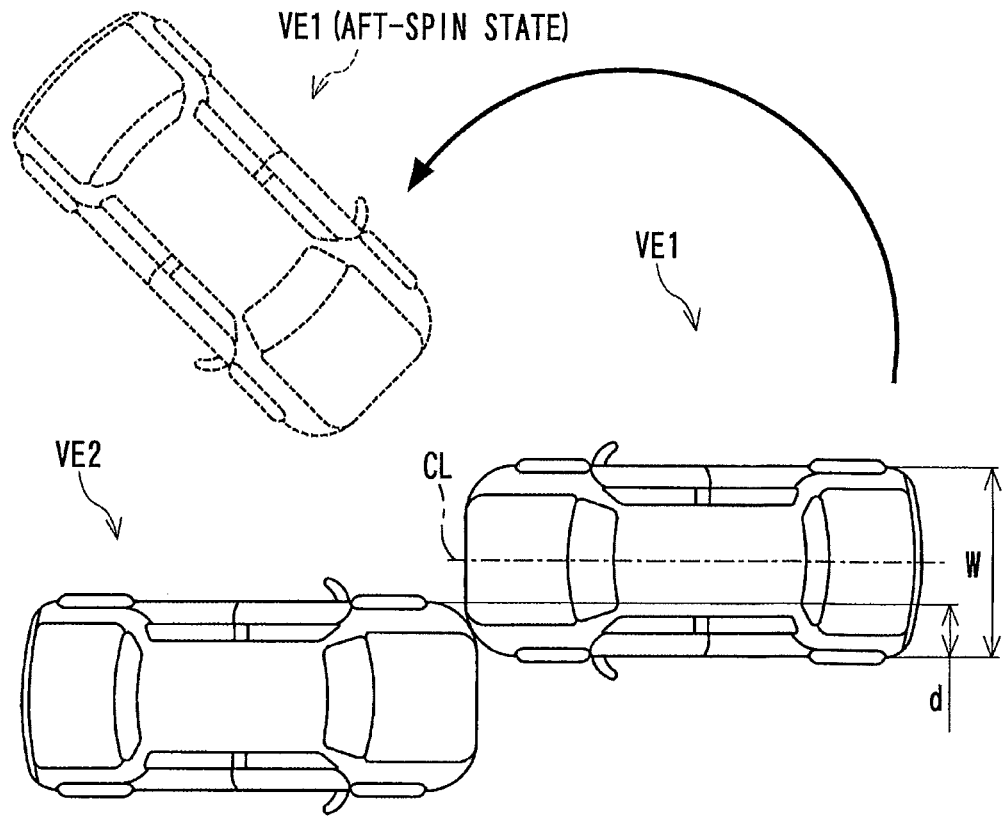
FIG. 3 is a plan view of one form of offset collision.
Figure 4:
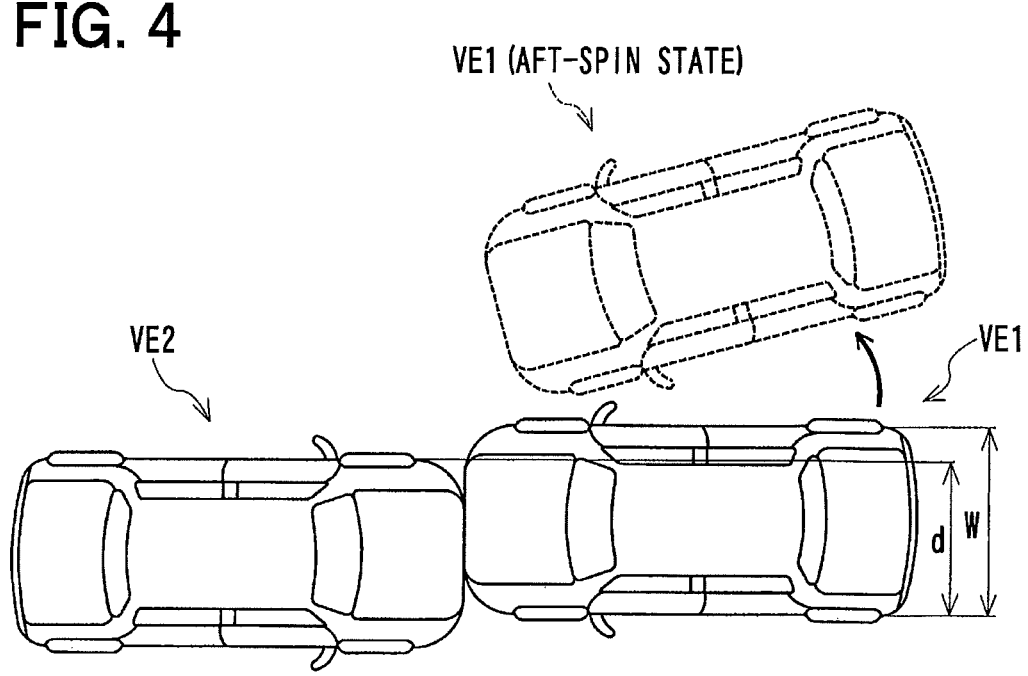
FIG. 4 is a plan view of another form of offset collision having a greater offset rate than the offset collision in FIG. 3.

Next, based on FIGS. 3 to 6, four offset collision forms in which the other vehicle VE2 collides with the front part of the vehicle VE1 are described. The offset collision described in the present disclosure includes a "parallel" collision and a "diagonal" collision as shown in FIGS. 3 and 4 or in FIGS. 5 and 6, in which the front-rear axis of the vehicle VE1 and the front-rear axis of the vehicle VE2 are either in parallel with each other or cross each other at a certain angle. In each of the those cases, the vehicles collide with each other at the front parts of the vehicles VE1 and VE2, and the rotation of the vehicle VE1 in a counter-clockwise direction is expected after the collision, as shown in the illustration of FIGS. 3 to 6.

As shown in FIG. 3, when the vehicle VE1 and the other vehicle VE2 collide in a parallel state in which the axes of the both vehicles are in parallel with each other at their front parts, the offset rate may be represented as (d/W), in which d is an overlap amount of the two vehicles and W is a width of the vehicle VE1. The collision angle in this collision form is 0 (zero) degrees. The offset direction in this collision is a left side, since, in this collision form, a collision part is on the left side of the vehicle VE1 relative to the center line CL. The collision direction in this collision form may either be the rightward direction or the leftward direction in terms of determination by the collision angle determination part 9c, since the vehicles VE1 and VE2 collide in the parallel state, i.e., with their front-rear axes aligned in parallel with each other.

By the offset collision of the other vehicle VE2 to the front part of the vehicle VE1, the vehicle VE1 rotates (i.e., spins) at a predetermined rotation angle and rotation angular velocity. Therefore, it may be appropriate to operate the airbags 10-15, and hold the occupant against the impact that is caused by the rotation of the vehicle VE1. The relative speed, the offset rate, the collision angle, the offset direction, and the collision direction which are described above respectively correspond to the level of the offset collision.

The "level of the offset collision" is a concept or an index of the offset collision for estimating the rotation angle and the rotation angular velocity when the other vehicle VE2 offset-collides with the front part of the vehicle VE1 to cause a spin of the vehicle VE1. When the level of the offset collision is high, the rotation angle and the rotation angular velocity of the vehicle VE1 are estimated to be great in such a collision, and when the level is low, the rotation angle and the rotation angular velocity of the vehicle VE1 are estimated to be small in such a collision.

As the level of the offset collision, all of the relative speed, the offset rate, the collision angle, the offset direction, and the collision direction are not necessarily required at the same time, i.e., only a few of them may be used.

The airbag controller 9 controls an operating method of the airbags 10-15 based on the level of the offset collision. The operating method of the airbags 10-15 according to the level of the offset collision may be experimentally defined based on repeated experiments, etc.

In the case shown in FIG. 3, as mentioned above, the vehicle VE1 rotates counter clockwise, and the occupant with inertia stays, i.e., left from the rotational movement of the vehicle VE1 after the collision, at the position which suffers from a left-side impact. Therefore, from among the airbags 10-15 which include right-left paired airbags, only the left windshield post airbag 11 and the left curtain airbag 14 which are disposed on the left-hand side in the vehicle compartment CV may be deployed, and the right windshield post airbag 10 and the right curtain airbag 13 may not.

On the other hand, in the case of the offset collision in FIG. 4, the overlap amount d is greater than the case in FIG. 3, i.e., the offset rate of the other vehicle VE2 relative to the vehicle VE1 is greater than the FIG. 3 case. Therefore, in the offset collision shown in FIG. 4, the level of the offset collision becomes small, and the vehicle VE1 rotates at a smaller rotation angle and at a smaller rotation angular velocity than in FIG. 3.

In such case, the airbag controller 9 performs the deployment operation of the airbags 10-15 in a different manner, i.e., in a different control method from the case in FIG. 3. In the offset collision in FIG. 4, the collision angle is 0 (zero)

degrees, and the offset direction is toward a left side, and the collision direction may be either a leftward direction or a rightward direction.

Figure 5:
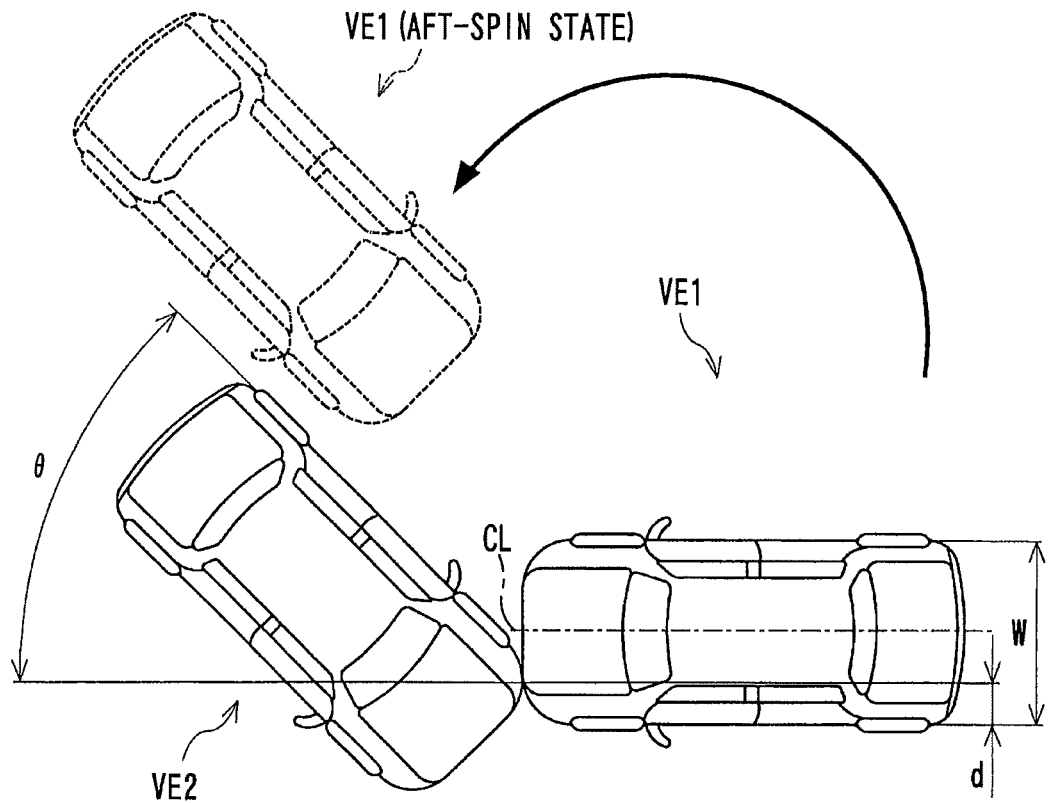
FIG. 5 is a plan view of yet another form of offset collision different from the offset collision in FIG. 3.

On the other hand, as shown in FIG. 5, when the other vehicle VE2 collides diagonally with the front part of the vehicle VE1, the width dimension between the collision part of the front part of the vehicle VE1 and the side-most part of the vehicle VE1 along the travel direction of the other vehicle VE2 is measured as the overlap amount d. Even in this case, by defining the width of the vehicle VE1 as W, the offset rate is represented as d/W.

Further, in this case, as shown in FIG. 5, the collision angle of the other vehicle VE2 relative to the vehicle VE1 is θ°. The offset direction in this case is also the left side in the same manner as the case in FIG. 3, since the colliding part of the vehicle VE1 is mainly on the left side of the vehicle VE1 relative to the center line CL. Further, since the other vehicle VE2 collides with the vehicle VE1 in the move direction towards the left-hand side of the vehicle VE1, the collision direction in this case is toward the left side.

Same as the case in FIG. 3, the vehicle VE1 in FIG. 5 rotates counter clockwise by a predetermined rotation angle and at a predetermined rotation angular velocity, from among the airbags 10-15 which include right-left paired airbags, only the left windshield post airbag 11 and the left curtain airbag 14 which are disposed on the left-hand side in the vehicle compartment CV may be deployed, and the right windshield post airbag 10 and the right curtain airbag 13 may not.

Figure 6:
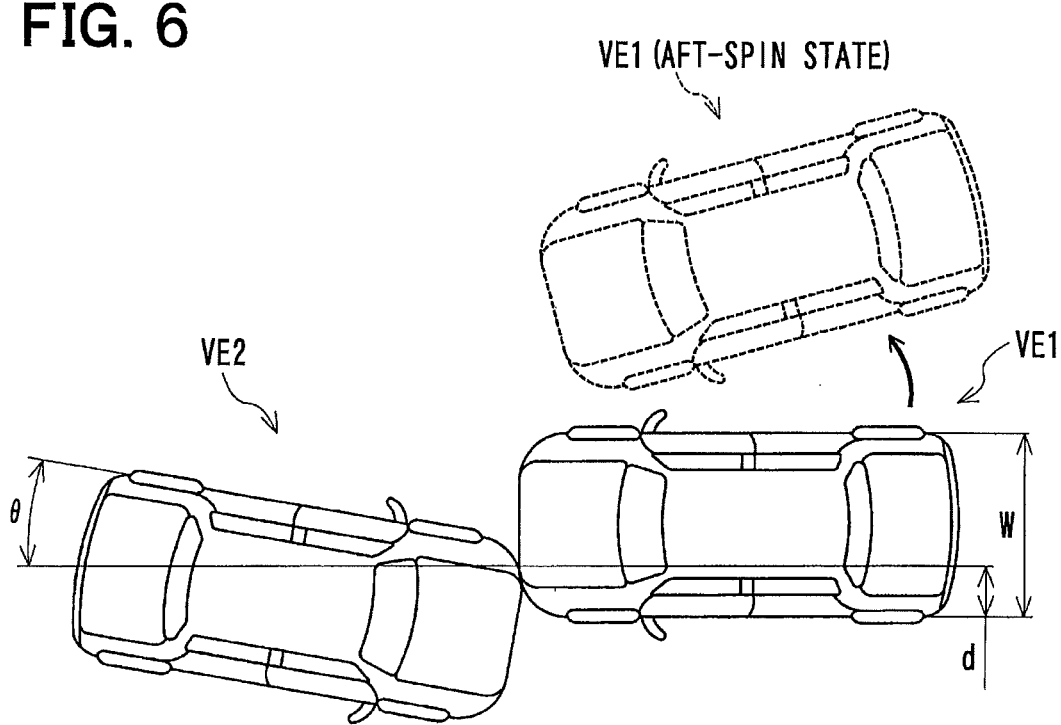
FIG. 6 is a plan view of still yet another form of offset collision having a smaller collision angle than the offset collision in FIG. 5.

In the offset collision shown in FIG. 6, a collision angle θ is smaller than the one in FIG. 5. Therefore, in the case of the offset collision in FIG. 6, the level of the offset collision becomes small, and the vehicle VE1 rotates at a rotation angle and the rotation angular velocity that are respectively smaller than the case in FIG. 5.

In this case, the airbag controller 9 performs the deployment operation of the airbags 10-15 in a different manner, i.e., in a different control method from the case in FIG. 5. Further, in the offset collision in FIG. 6, the offset direction is toward a left side, and the collision direction is a leftward direction.

Figure 7:
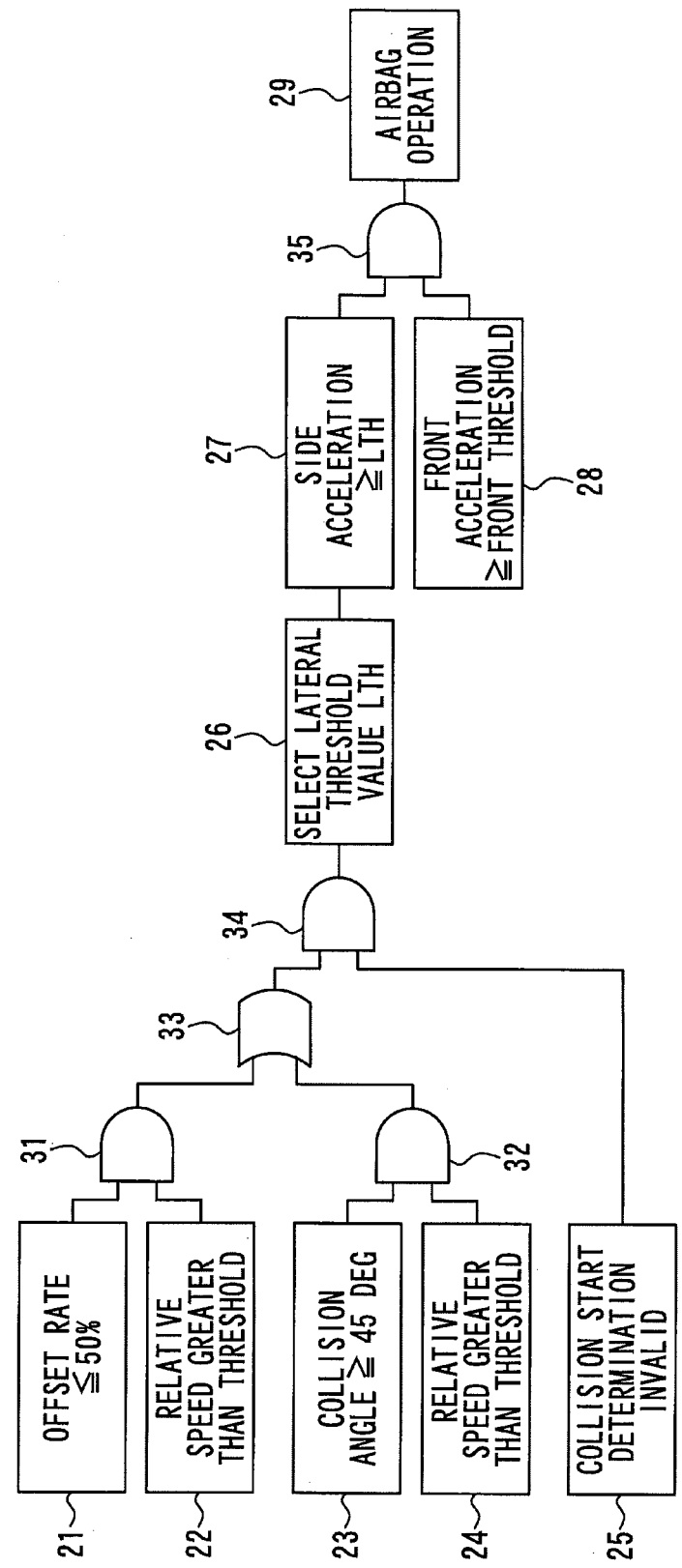
FIG. 7 is a block diagram of a determination logic of the vehicle occupant protection device.

Next, based on an illustration in FIG. 7, a determination logic of the airbag controller 9 determining a deployment of the airbags 10-15 is described, which is used at a time when the other vehicle VE2 offset-collides with the front part of the vehicle VE1. As shown in FIG. 7, a first AND gate 31 receives (i) an input of a signal 21 which is HI when the offset rate is equal to or less than 50%, and (ii) an input of a signal 22 which is HI when the relative speed of the vehicle VE1 and the other vehicle VE2 is equal to or greater than a predetermined threshold value. Further, a second AND gate 32 receives (iii) a signal 23 which is HI when the collision angle is equal to or greater than 45 degrees, and (iv) an input of a signal 24 which is HI when the relative speed of the vehicle VE1 and the other vehicle VE2 is equal to or greater than the predetermined threshold value. Output signals from the first AND gate 31 and the second AND gate 32 are inputted to an OR gate 33. Therefore, (A) when the offset rate is equal to or less than 50% and the relative speed of the vehicle VE1 and the other vehicle VE2 is equal to or greater than the predetermined threshold value, or (B) when the collision angle is equal to or greater than 45 degrees and the relative speed of the vehicle VE1 and the other vehicle VE2 is equal to or greater than the predetermined threshold value, the output signal of the OR gate 33 becomes Hi.

The output signal of the OR gate 33 is inputted to one of the input terminals of a third AND gate 34. The other input terminal of the third AND gate 34 receives an input of a signal 25 which is HI when a collision start determination is invalid, i.e., when it is determined that no collision is caused in the vehicle based on the impact detected by the acceleration sensors 2-5. In other words, the airbag controller 9 prohibits a selection of one of the plural lateral threshold values when the collision start determination is not invalid, i.e., after it is determined that the other vehicle VE2 has collided with the vehicle VE1. Therefore, when the output signal of the OR gate 33 is set to HI based on before-collision detection values of the offset rate, the collision angle, and the relative speed which are calculated based on image data before the start of the collision (i.e., pre-crash prediction values of the offset rate/collision angle/relative speed), the output signal of the third AND gate 34 becomes HI, which leads to a selection of one of many lateral threshold values LTH from among the values stored in the acceleration threshold storage device 8, which is marked by a numeral 26.

When one of the lateral threshold values LTH is selected from among the values stored in the acceleration threshold storage device 8, a signal 27 which is HI when a side acceleration is equal to or greater than the (selected) lateral threshold value LTH, and a signal 28 which is HI when a front acceleration is equal to or greater than a front threshold value will both be inputted to a fourth AND gate 35.

Therefore, when the side acceleration is equal to or greater than the (selected) lateral threshold value LTH and the front acceleration is equal to or greater than the front threshold value, the output signal of the fourth AND gate 35 becomes Hi, and a deployment operation of the airbags 10-15 is performed, which is shown by a numeral 29. Whether the front acceleration is equal to or greater than the front threshold may also be determined based on a collision determination signal of a front collision airbag system pre-existing in the vehicle VE1.

Figure 8:
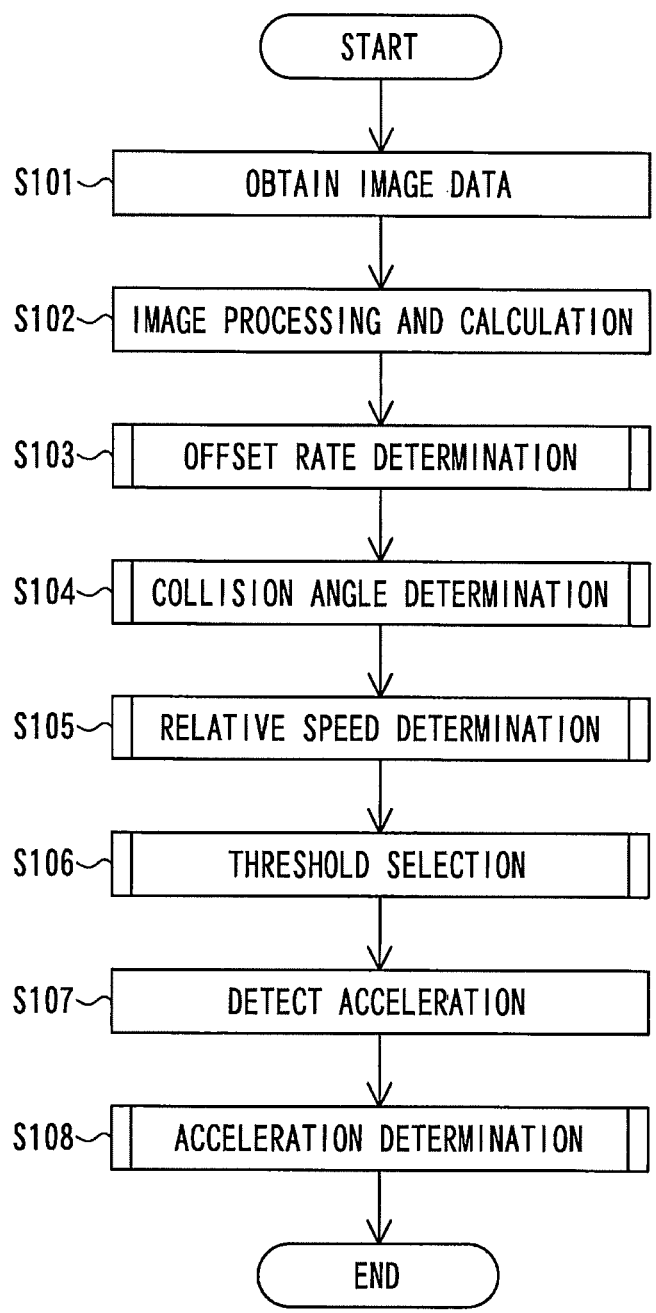
FIG. 8 is a flowchart of an occupant protection control of the vehicle occupant protection device.

Next, based on FIG. 8, the flowchart of the occupant protection control by the airbag controller 9 when the other vehicle VE2 offset-collides with the front part of the vehicle VE1 is described.

First, the image data captured with the in-vehicle camera 6 is obtained (Step S101). That is, the image processing and calculation of the obtained image data is performed by the image process arithmetic unit 7, which is for the calculation of just-before-collision values of the relative speed, the offset rate, and the collision angle, as well as for the detection of the offset direction and the collision direction (Step S102).

Next, the calculated offset rate is compared with the predetermined threshold value in the offset rate determination part 9b, and an offset determination value is set based on a comparison result and the detected offset direction (Step S103: an offset rate determination control).

Next, the calculated collision angle is compared with the predetermined threshold value in the collision angle determination part 9c, and an angle determination value is set based on a comparison result and the detected collision direction (Step S104: a collision angle determination control).

Next, the calculated relative speed is compared with the predetermined threshold value in the relative speed determination part 9d (Step S105: a relative speed determination control).

Next, one lateral threshold value LTH is selected from among many values stored in the threshold value selecting part 9e by the acceleration threshold storage device 8 based on (i) the offset determination value and the angle determination value that are already set, (ii) the comparison result of the relative speed with the threshold value, and (iii) the detected offset direction and the detected collision direction (Step S106: a threshold value selection control).

Next, the front acceleration detected by the front-right acceleration sensor 2 and the front-left acceleration sensor 3 and the side acceleration detected by the side-right acceleration sensor 4 and the side-left acceleration sensor 5 are respectively inputted to the input part 9a (Step S107).

Next, the acceleration determination part 9f compares the detected front acceleration with the front threshold value stored in the acceleration threshold storage device 8, and compares the detected side acceleration with the lateral threshold value LTH selected by the threshold value selecting part 9e, respectively. When at least one of the front acceleration values from the front acceleration of the front-right acceleration sensor 2 and the front left acceleration sensors 3 is equal to or greater than the front threshold value and when at least one of the side acceleration values from the side-right acceleration sensor 4 and the side left acceleration sensors 5 is equal to or greater than the lateral threshold value LTH (i.e., when two "whens" are satisfied at the same time), the deployment operation of the airbags 10-15 is performed (Step S108: an acceleration determination control).

Figure 9:
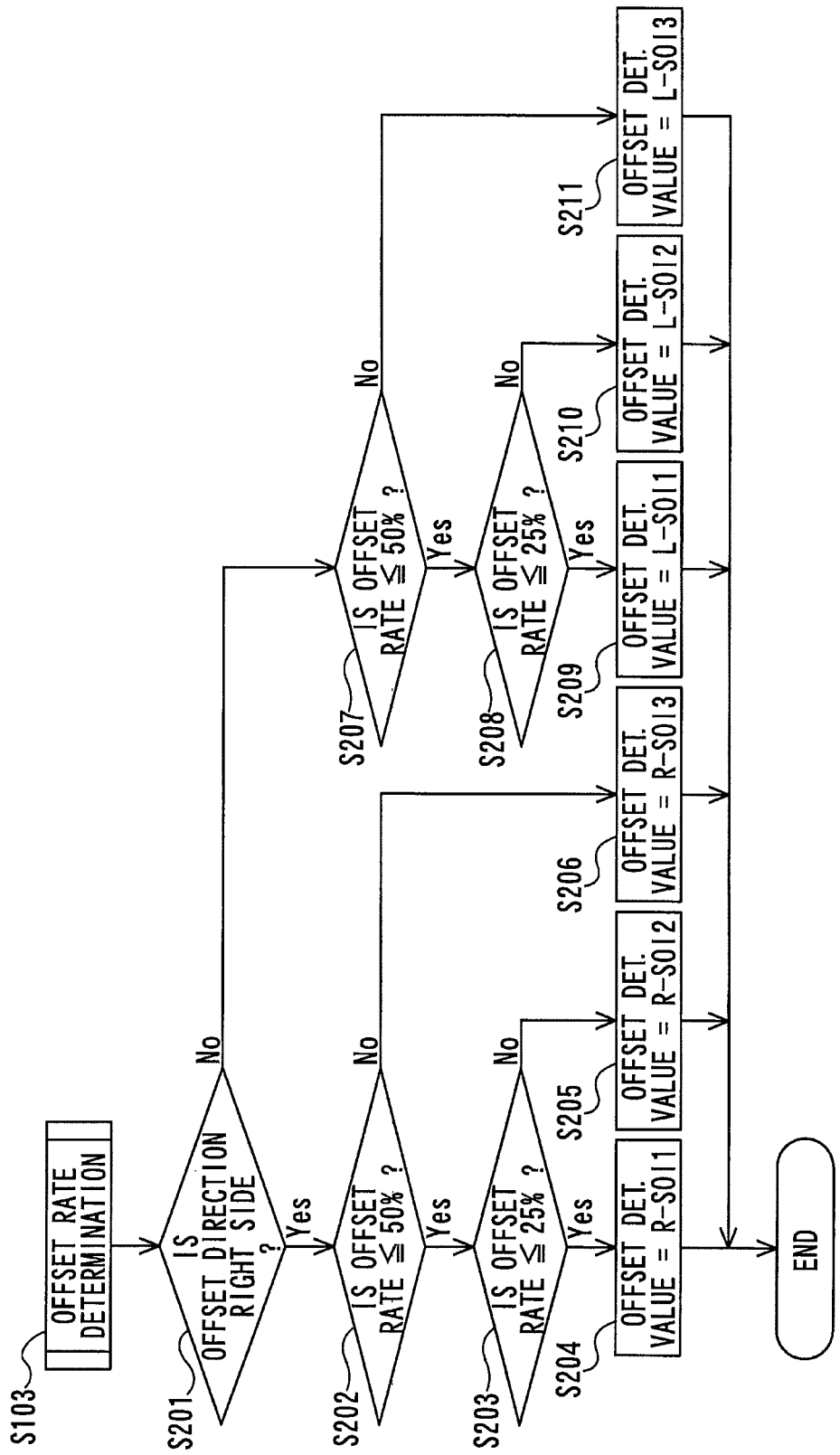
FIG. 9 is a flowchart of an offset rate determination control in FIG. 8.

Next, based on the flowchart in FIG. 9, the flowchart of the offset rate determination control shown in Step S103 of FIG. 8 is described.

First, it is determined whether the offset direction of the other vehicle VE2 relative to the vehicle VE1 is a right side (Step S201). When the offset direction is the right side (Step S201: Yes), it is determined whether the offset rate is equal to or less than 50% (Step S202). When the offset rate is 50% or less, it is further determined whether the offset rate is 25% or less (Step S203). When the offset rate is 25% or less (Step S203: Yes), the offset determination value is set to right SOI1 (Step S204). In Step S203, when it is determined that the offset rate is greater than 25% (Step S203: No), the offset determination value is set to right SOI2 (Step S205).

In Step S202, when it is determined that the offset rate is greater than 50% (Step S202: No), the offset determination value is set to right SOI3 (Step S206).

On the other hand, in Step S201, when it is determined that the offset direction is not the right side (Step S201: No), it is determined whether the offset rate is 50% or less (Step S207).

When the offset rate is 50% or less (Step S207: Yes), it is further determined whether the offset rate is 25% or less (Step S208). When the offset rate is 25% or less (Step S208: Yes), the offset determination value is set to left SOI1 (Step S209). In Step S208, when it is determined that the offset rate is greater than 25% (Step S208: No), the offset determination value is set to left SOI2 (Step S210). In Step S207, when it is determined that the offset rate is greater than 50% (Step S207: No), the offset determination value is set to left SOI3 (Step S211).

Figure 10:
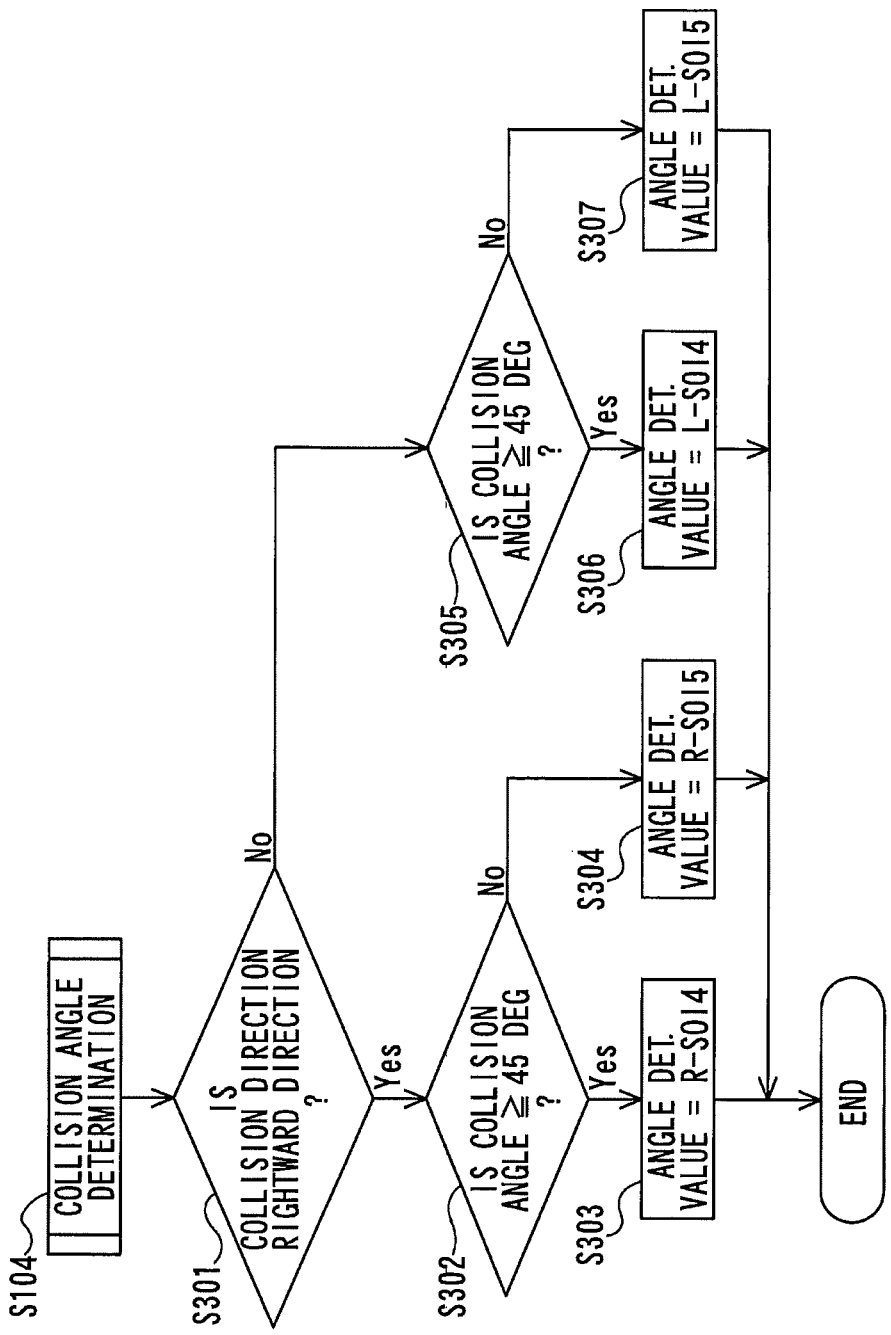
FIG. 10 is a flowchart of a collision angle determination control in FIG. 8.
Figure 11:
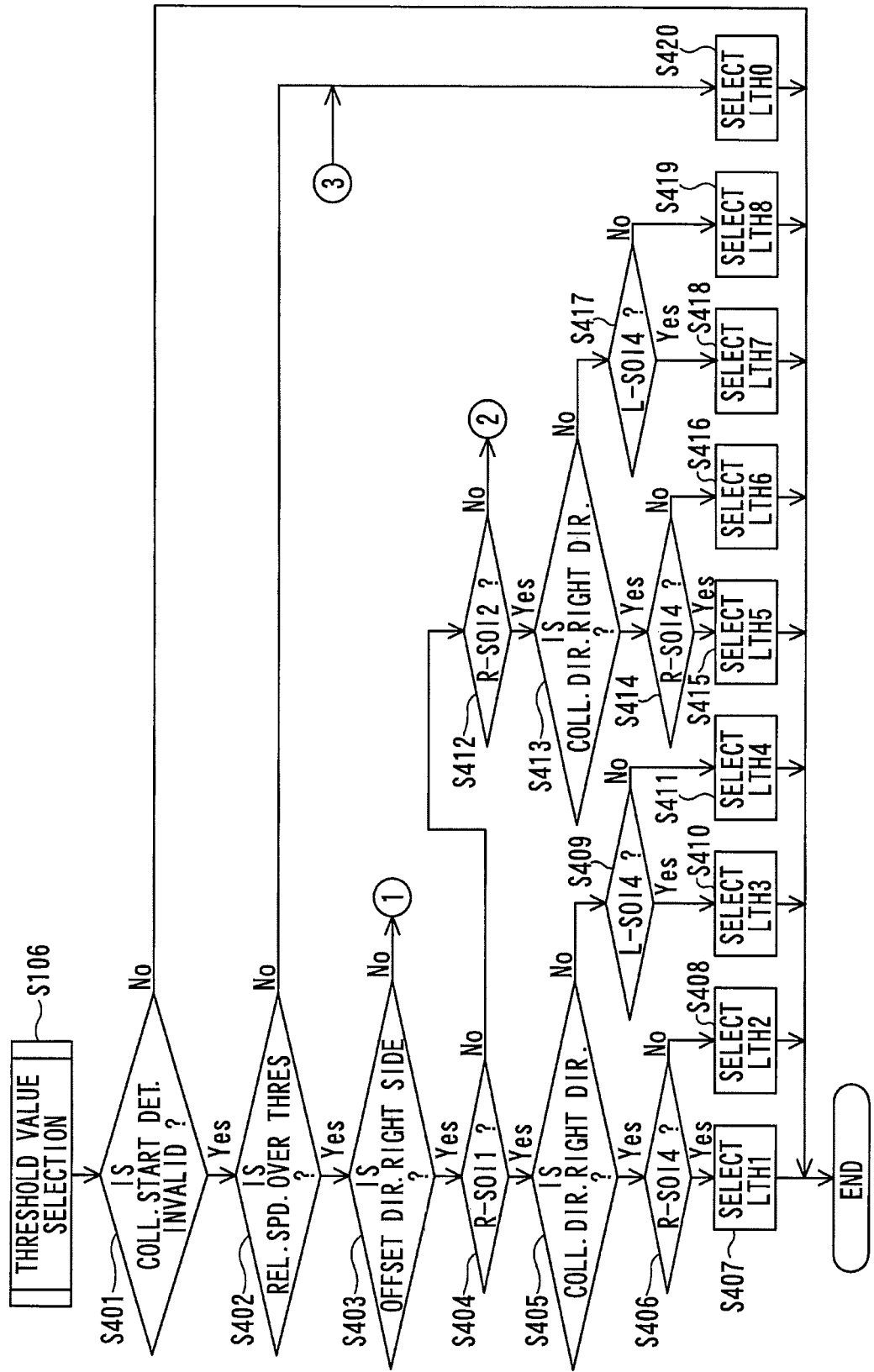
FIG. 11 is a flowchart of a threshold value selection control in FIG. 8.
Figure 12:
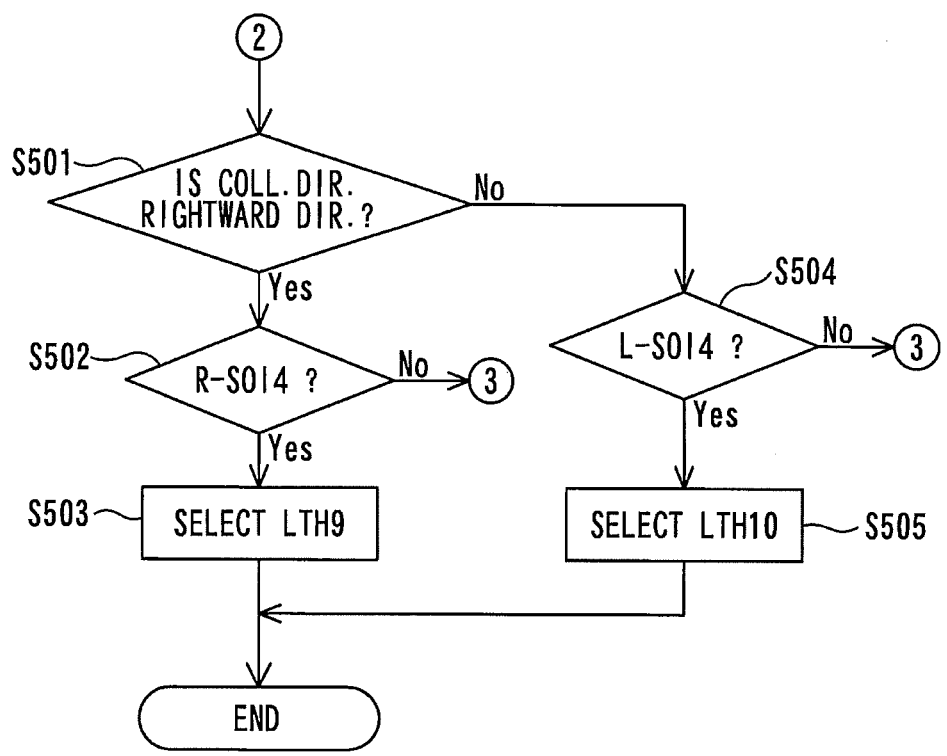
FIG. 12 is another flowchart of the threshold value selection control in connection to the flowchart in FIG. 11.

Next, based on FIG. 10, the flowchart of the collision angle determination control shown in Step S104 of FIG. 8 is described.

First, it is determined whether the collision direction of the vehicle VE1 of the other vehicle VE2 is a rightward direction (Step S301). When the collision direction is the rightward direction (Step S301: Yes), it is determined whether the collision angle is equal to or greater than 45 degrees (Step S302). When the collision angle is equal to or greater than 45 degrees (Step S302: Yes), the angle determination value is set to right SOI4 (Step S303). In Step S302, when it is determined that the collision angle is less than 45 degrees (Step S302: No), the angle determination value is set to right SOI5 (Step S304).

On the other hand, in Step S301, when it is determined that the collision direction is not the rightward direction, it is determined whether the collision angle is equal to or greater than 45 degrees (Step S305). When the collision angle is equal to or greater than 45 degrees (Step S305: Yes), the angle determination value is set to left SOI4 (Step S306). In Step S305, when it is determined that the collision angle is less than 45 degrees (Step S305: No), the angle determination value is set to left SOI5 (Step S307).

Next, based on FIGS. 11 to 14, the flowchart of the threshold value selection control shown in Step S106 of FIG. 8 is described. At the start time of the present control, the lateral threshold value LTH is set to the initial value LTH0 which is an initial threshold value of the lateral threshold values. The selection of one of the lateral threshold values has to be performed before the vehicle VE1 drastically changes its position due to the collision. Therefore, it is firstly determined in Step S401 whether a collision start determination is invalid. Whether a collision start determination is invalid is determined based on, for example, the fact that none of the front-right acceleration sensor 2 and the front-left acceleration sensor 3 is detecting an over-threshold value acceleration. Whether the collision start determination is invalid may also be determined based on the position of the other vehicle VE2 detected by the in-vehicle camera 6, i.e., when the position of the other vehicle VE2 in the captured image of the in-vehicle camera 6 is away from the vehicle VE1 by a preset distance. When the collision start determination is not invalid, i.e., when the collision of the vehicle VE1 and the other vehicle VE2 has already started, this flow of the present control is ended.

When the collision start determination is invalid, it is determined whether the relative speed of the vehicle VE1 and the other vehicle VE2 is equal to or greater than a threshold value (Step S402). When the relative speed of the vehicle VE1 and the other vehicle VE2 is less than the threshold value (Step S402: Yes), the lateral threshold value LTH is left unchanged as LTH0 which is an initial value, and the flow of the present control is ended (Step S420). When the relative speed of the vehicle VE1 and the other vehicle VE2 is equal to or greater than a threshold value (Step S402: No), it is determined whether the offset direction of the other vehicle VE2 relative to the vehicle VE1 is the right side (Step S403). When the offset direction is the right side, it is determined whether the offset determination value has been set to right SOI1 in the offset rate determination control mentioned above (Step S404). If it is determined that the offset determination value has been set to right SOI1, it is determined whether the collision direction of the other vehicle VE2 relative to the vehicle VE1 is the rightward direction (Step S405). When the collision direction is the rightward direction (S405: Yes), it is determined whether the angle determination value has been set to right SOI4 in the collision angle determination control mentioned above (Step S406). If it is determined that the angle determination value has been set to right SOI4 (Step S406: Yes), LTH1 is selected as the lateral threshold value (Step S407).

In Step S406, if it is determined that the angle determination value has not been set to right SOI4 (Step S406: No), LTH2 is selected as the lateral threshold value (Step S408). When the collision direction is not the rightward direction in Step S405, it is determined whether the angle determination value has been set to left SOI4 in the collision angle determination control (Step S409). If it is determined that the angle determination value has been set to left SOI4 (Step S409: Yes), LTH3 is selected as the lateral threshold value (Step S410). If it is determined that the angle determination value has not been set to left SOI4 (Step S409: No), LTH4 is selected as the lateral threshold value (Step S411).

In Step S404 mentioned above, if it is determined that the offset determination value has not been set to right SOI1, in the offset rate determination control, it is determined whether the offset determination value has been set to right SOI2 (Step S412). If it is determined that the offset determination value has been set to right SOI2 (Step S412: Yes), it is determined whether the collision direction of the other vehicle VE2 relative to the vehicle VE1 is the rightward direction (Step S413). When the collision direction is the rightward direction (Step S413: Yes), it is determined whether the angle determination value has been set to right SOI4 in the collision angle determination control (Step S414). If it is determined that the angle determination value has been set to right SOI4 (Step S414: Yes), LTH5 is selected as the lateral threshold value (Step S415). If it is determined that the angle determination value has not been set to right SOI4 (Step S414: No), LTH6 is selected as the lateral threshold value (Step S416).

In Step S413, when the collision direction is not the rightward direction, it is determined whether the angle determination value has been set to left SOI4 in the collision angle determination control (Step S417). If it is determined that the angle determination value has been set to left SOI4 (Step S417: Yes), LTH7 is selected as the lateral threshold value (Step S418). If it is determined that the angle determination value has not been set to left SOI4 (Step S417: No), LTH8 is selected as the lateral threshold value (Step S419).

In Step S412 mentioned above, if it is determined that the offset determination value has not been set to right SOI2 (Step S412: No), it is determined whether the collision direction of the other vehicle VE2 relative to the vehicle VE1 is the rightward direction (Step S501 in FIG. 12).

When the collision direction is the rightward direction (Step S501: Yes), it is determined whether the angle determination value has been set to right SOI4 in the collision angle determination control (Step S502). If it is determined that the angle determination value has been set to right SOI4 (Step S502: Yes), LTH9 is selected as the lateral threshold value (Step S503). If it is determined that the angle determination value has not been set to right SOI4 (Step S502: No), LTH0, which is an initial value, is used as the lateral threshold value (Step S420).

In Step S501, when the collision direction is not the rightward direction (Step S501: No), it is determined whether the angle determination value has been set to left SOI4 in the collision angle determination control (Step S504). If it is determined that the angle determination value has been set to left SOI4 (Step S504: Yes), LTH10 is selected as the lateral threshold value (Step S505). If it is determined that the angle determination value has not been set to left SOI4 (Step S504: No), the lateral threshold value LTH is left unchanged from the value LTH0 which is an initial value (Step S420).

Figure 13:
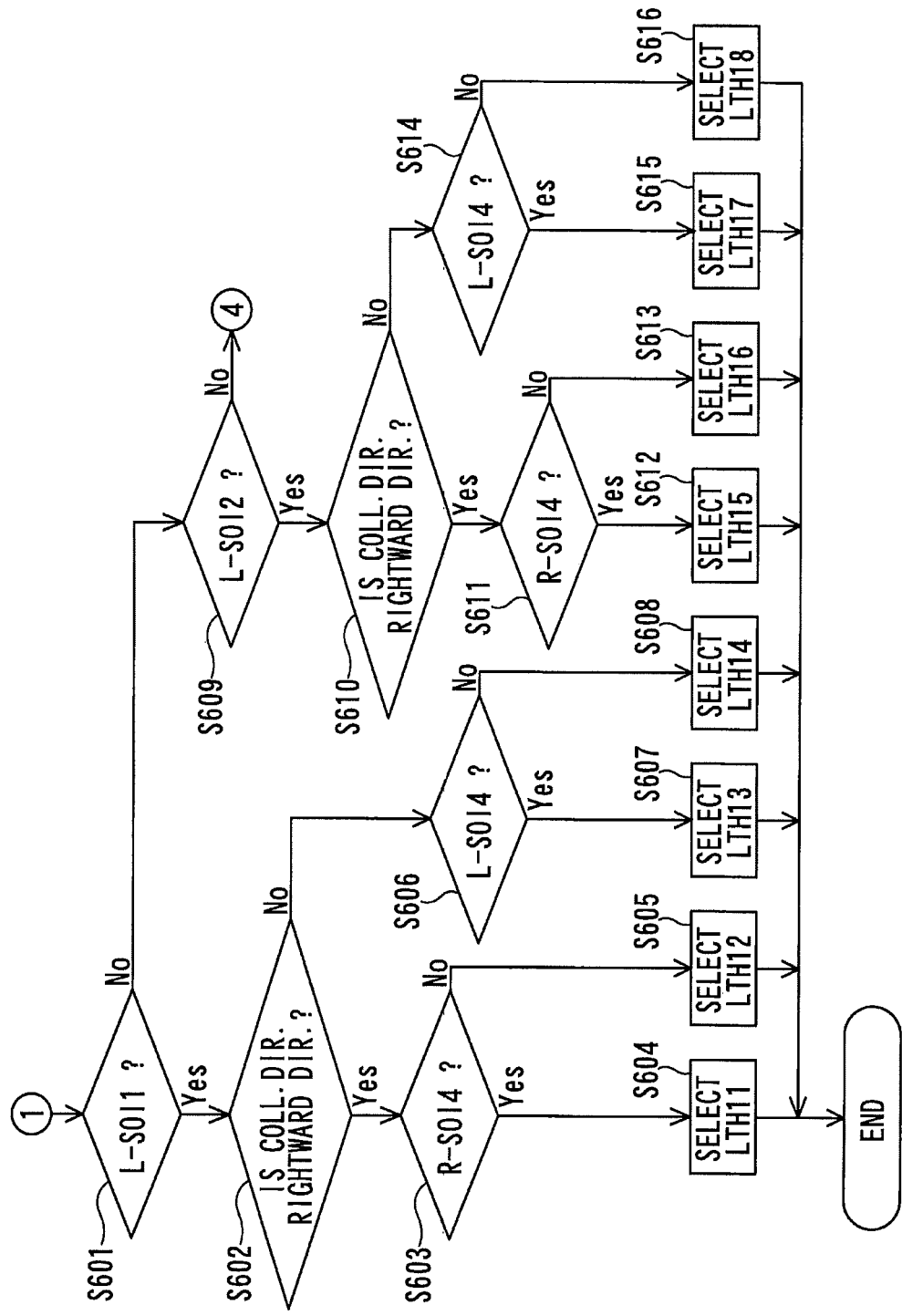
FIG. 13 is yet another flowchart of the threshold value selection control in connection to the flowchart in FIG. 11.
Figure 14:
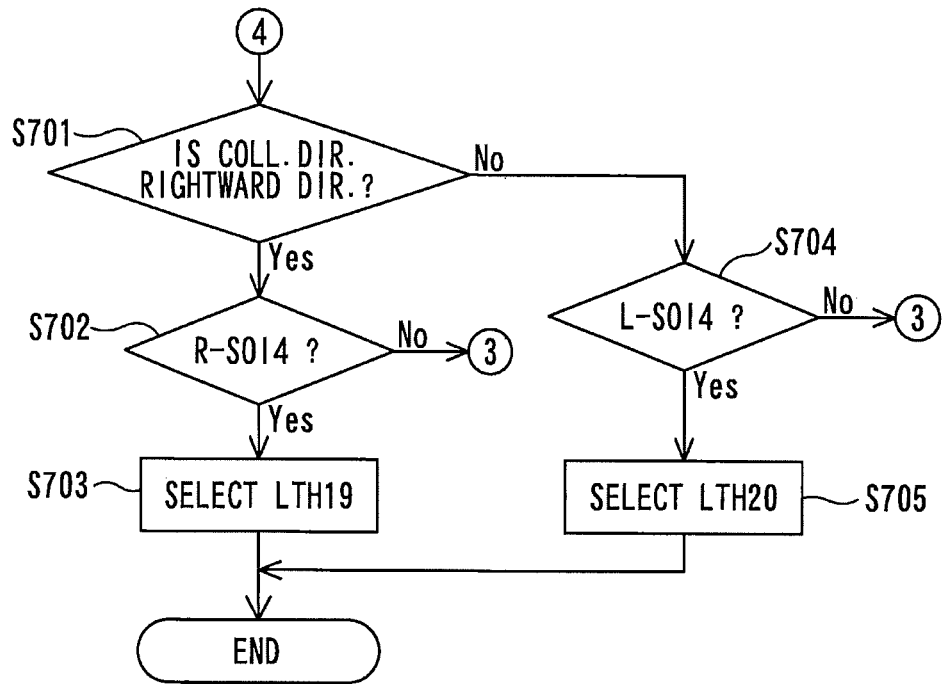
FIG. 14 is another flowchart of the threshold value selection control in connection to the flowchart in FIG. 13.

On the other hand, in Step S403 mentioned above, when the offset direction of the other vehicle VE2 relative to the vehicle VE1 is not the rightward direction, the process proceeds to Step S601 shown in FIG. 13. Now, the process of Step S601 and subsequent processes are performed as shown in FIGS. 13 and 14, which are substantially the same processes of steps in FIGS. 11 and 12 except that Step S601 determines whether the offset determination value has been set to left SOI1 and Step S609 determines whether the offset determination value has been set to left SOI2, as well as the threshold values LTH set in subsequent steps of S601/S609 are different therefrom. That is, detailed description regarding FIGS. 13 and 14 except for the above is omitted.

In the threshold value selection control mentioned above, when it is determined that the relative speed is equal to or greater than the threshold value, the lateral threshold value LTH is selected as one of the plural values LTH1 to LTH20 based on the offset determination value and the angle determination value, when the offset determination value, which is set based on the offset direction and the offset rate, is either of right SOI1, right SOI2, left SOI1, or left SOI2, OR when the angle determination value, which is set based on the collision direction and the collision angle, is either of right SOI4 or left SOI4.

On the other hand, when the relative speed is less than the threshold value or the offset determination value is right SOI3 or left SOI3 AND the angle determination value is right SOI5 or left SOI5, the level of the offset collision is determined as being equal to or less than the rotation threshold value. In such case, it is determined that the rotation of the colliding vehicle VE1 does not require the operation of the airbags 10-15, and the lateral threshold value is left unchanged from the initial value LTH0.

Figure 15:
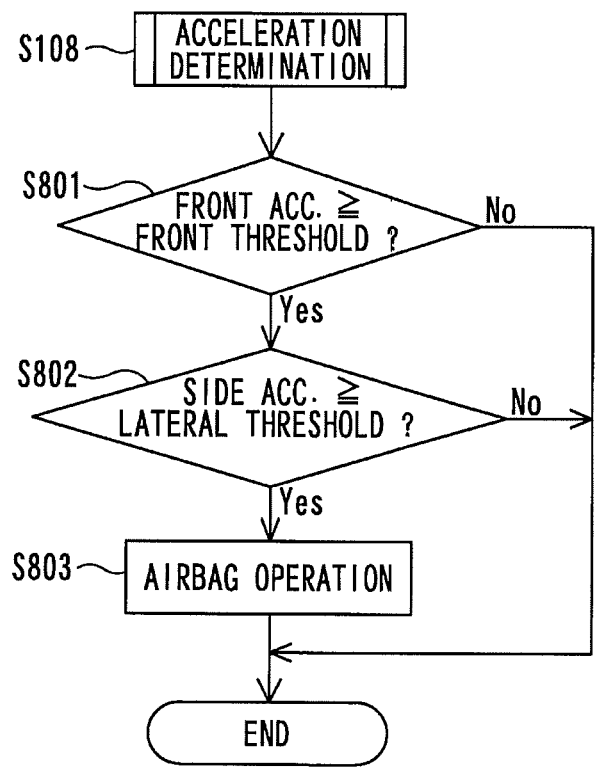
FIG. 15 is a flowchart of an acceleration determination control in FIG. 8.

Next, based on FIG. 15, the flowchart of the acceleration determination control shown in Step S108 of FIG. 8 is described.

First, it is determined whether the front acceleration detected either by the front-right acceleration sensor 2 or the front-left acceleration sensor 3 is equal to or greater than the front threshold value stored in the acceleration threshold storage device 8 (Step S801).

When the front acceleration detected by both the front-right acceleration sensor 2 and the front-left acceleration sensor 3 is less than the front threshold value (Step S801: No), the flow of the present control is ended.

When the front acceleration detected by either one of the front-right acceleration sensor 2 or the front-left acceleration sensor 3 is equal to or greater than the front threshold value (Step S801: Yes), it is then determined whether the side acceleration detected either by the side-right acceleration sensor 4 or the side-left acceleration sensor 5 is equal to or greater than the selected value of the lateral threshold value LTH (Step S802).

When the side acceleration detected by both the side-right acceleration sensor 4 and the side-left acceleration sensor 5 is less than lateral threshold value LTH (Step S802: No), the flow of the present control is ended.

When the side acceleration detected by either one of the side-right acceleration sensor 4 or the side-left acceleration sensor 5 is equal to or greater than lateral threshold value LTH (Step S802: Yes), the airbags 10-15 are operated (Step S803).

When the airbag is not operated, the process returns to Step S101 for obtaining the image data.

In such case, it is determined, in Step S803, based on the detected front acceleration and the detected side acceleration as well as the detected relative speed, and the lateral threshold value LTH set in the above-described manner, which of the airbags 10-15 is/are operated.

The airbag controller 9 may selectively operate one or more of the plural airbags 10-15 based on the level of the offset collision detected by the image process arithmetic unit 7.

For example, the airbag controller 9 may operate the right curtain airbag 13 or the left curtain airbag 14 without operating other airbags 10, 11, 12, 15 when the level of the offset collision is less than the first preset value. In such case, in addition to the right or left curtain airbags 13, 14, a seatbelt pretensioner (not illustrated) may be operated. Further, when the level of the offset collision is greater than the first preset value, at least one of the airbags 10, 11, 12, 15 may be operated in addition to the right or left curtain airbags 13, 14.

Further, the level of the offset collision detected by the image process arithmetic unit 7 may be less than the second preset value. In such case, from among the right windshield post airbag 10, the left windshield post airbag 11, the right curtain airbag 13, and the left curtain airbag 14, the airbags that are disposed on an opposite side that is opposite in a right-left direction relative to a rotation of the vehicle may be operated. For example, when the rotation of the vehicle VE1 is counter-clockwise (i.e., toward the right direction of the vehicle VE1) as shown in FIG. 4, the left windshield post airbag or the left curtain airbag 14 is operated.

Further, the level of the offset collision detected by the image process arithmetic unit 7 may be equal to or greater than the second preset value. In such case, after operating the airbags 10, 11, 13, 14 that are disposed on an opposite side of the rotation direction of the vehicle VE1, the airbags 10, 11, 13, 14 that are disposed on the rotation direction of the vehicle VE1 may be operated. For example, when the rotation of the vehicle VE1 is counter-clockwise (i.e., toward the right direction of the vehicle VE1) as shown in FIG. 3, the left windshield post airbag 11 or the left curtain airbag 14 is operated first, and, subsequently, the right windshield post airbag 10 or the right curtain airbag 13 is operated.

Effects of the Embodiment

According to the present embodiment, the airbag controller 9 has already selected (at a pre-crash moment) one of the lateral threshold values LTH based on the level of the offset collision derived from the image processing and calculation by the image process arithmetic unit 7, which are stored in the acceleration threshold storage device 8. Therefore, according to the level of the offset collision, the rotation of the vehicle VE1 may be predicted and a smaller lateral threshold value LTH may be selected (for a sufficient protection of the vehicle occupant).

In other words, the level of the offset collision, in which the impact of the offset collision on the vehicle may tend to be detected by the side-right acceleration sensor 4 and the side-left acceleration sensor 5 as a smaller-than-actual value, is correctly determined based on the detection values of the side-right acceleration sensor 4 and the side-left acceleration sensor 5 when one of the lateral threshold values is "carefully" selected as described above according to the present embodiment, which enables the impact of the offset collision to be detected as exceeding the lateral threshold value, and enables the operation of the airbags 10-15, and which provides sufficient protection for the vehicle occupant.

Further, the rotation of the vehicle VE1 is predicted at an early stage based on the level of the offset collision, damage to or injury of the occupant by the rotation of the vehicle is prevented.

Also, the lateral threshold values are respectively used as a threshold for detecting a rotation of the vehicle VE1 based on the level of the offset collision. That is, in other words, the sensitivity of detection for detecting the rotation of the vehicle VE1 is changed based on the level of the offset collision detected by the image process arithmetic unit 7. Therefore, the rotation of the vehicle VE1 is accurately detected based on the level of the offset collision.

Additionally, the lateral threshold values are respectively used as a threshold for detecting a rotation of the vehicle VE1 caused by a small overlap collision. That is, in other words, the sensitivity of detection for detecting the rotation of the vehicle VE1 caused by the small overlap collision is changed based on the level of the offset collision detected by the image process arithmetic unit 7. Therefore, the rotation of the vehicle VE1 is accurately detected according to the state of the small overlap collision.

Still further, the threshold value selecting part 9e of the airbag controller 9 accurately estimates the rotation angle and the rotation angular velocity of a spin of the vehicle VE1 caused by the offset collision based on the offset rate which is a ratio of an overlap amount d against the width W of the vehicle VE1 and the relative speed of the vehicle VE1 and the other vehicle VE2, which collectively indicate the level of the offset collision. That is, by selecting an appropriate one of the plural lateral threshold values LTH based on the level of the offset collision, the rotation direction of the vehicle VE1 is accurately predicted. Therefore, based on such prediction, the damage to or injury of the vehicle occupant otherwise caused by the rotation of the vehicle is prevented.

Moreover, the threshold value selecting part 9e of the airbag controller 9 accurately estimates the rotation angle and the rotation angular velocity of a spin of the vehicle VE1 caused by offset collision based on the collision angle which is an angle of the vehicle VE2 relative to the vehicle VE1 and the relative speed of the vehicle VE1 and the other vehicle VE2, which may also collectively indicate the level of the offset collision. That is, by selecting an appropriate one of the plural lateral threshold values LTH based on the level of the offset collision, the rotation direction of the vehicle VE1 is accurately predicted. Therefore, based on such prediction, the damage to the vehicle occupant otherwise caused by the rotation of the vehicle is prevented.

Yet further, the airbag controller 9 operates the airbags 10-15 when one of the front-right acceleration sensor 2 or the front-left acceleration sensor 3, and one of the side-right acceleration sensor 4 or the side-left acceleration sensor 5, detect the impact that is equal to or greater than the respective threshold values, which guarantees a redundancy of rotation detection in the offset collision of the vehicle VE1 and prevents a malfunction of those airbags 10-15.

In other words, the selection of one of the plural lateral threshold values LTH is performed based on the level of the offset collision, the selected lateral threshold LTH may have a relatively small value. In such case, the sensitivity of the collision determination by the airbag controller 9 for the impact along the lateral direction of the vehicle VE1 is raised. However, the operation of the airbags 10-15 is "limited" when not only the side-right and the side-left acceleration sensors 4, 5 but also the front-right and the front-left acceleration sensors 2, 3 detect the impact. Therefore, a malfunction of the airbags 10-15 is prevented.

Further, the airbag controller 9 selects one of the lateral threshold values LTH based on the level of the offset collision detected by the image process arithmetic unit 7 just before the other vehicle VE2 collides with the vehicle VE1, which enables an accurate estimation of the rotation angle and the rotation angular velocity of the vehicle VE1, since, by estimating the angle and velocity before the collision actually happens, an influence of the impact of the collision is prevented from affecting the detection operation for detecting the level of the offset collision.

Also, the airbag controller 9 prohibits a selection of one of the plural lateral threshold values when the collision start determination is not invalid, i.e., after it is determined that the other vehicle VE2 has collided with the vehicle VE1 based on the level of the offset collision detected by the image process arithmetic unit 7. In such manner, the selection of one of the lateral threshold values after the collision of the vehicle VE1 with the other vehicle VE2 is prohibited. Therefore, even when the before-collision detection values, i.e., the offset rate, the relative speed, the collision angle respectively detected before collision, are changed after the collision due to the deformation of the vehicle VE1 by the collision, the level of the offset collision determined before the collision will not be updated, i.e., the before-collision determination value of the level of the offset collision is kept unchanged.

Therefore, based on the appropriately-determined before-collision determination value of the level of the offset collision, the lateral threshold value is set to an appropriate one.

Additionally, a device for detecting the level of the offset collision includes the in-vehicle camera 6 which is disposed in the vehicle VE1 and captures an image outside of the vehicle VE1, thereby making it easy for such device and the vehicle VE1 to detect the level of the offset collision. In addition, without causing a contact between the other vehicle VE2 and the vehicle VE1, the level of the offset collision just before the collision is detected, which means that the level of the offset collision is detected at a just-before-collision moment.

Moreover, by detecting the level of the offset collision just before the collision with the in-vehicle camera 6, the rotation of the vehicle VE1 is predicted at an early stage, thereby enabling a prevention of the damage to the occupant which may otherwise be caused by the rotation of the vehicle VE1.

Still further, the airbags 10-15 are provided as an occupant protector, which securely holds the occupant body in the offset collision against the impact of the vehicle VE1 and sufficiently prevent the damage to the vehicle occupant that may otherwise be caused by the rotation of the vehicle VE1.

Yet further, the airbag controller 9 selects one or more of the airbags 10-15 and operates the selected airbag(s) based on the level of the offset collision detected by the image process arithmetic unit 7. In such manner, when the level of the offset collision is low and no big rotation of the vehicle VE1 is caused, the operation/deployment of the airbags that need not be operated is prevented. Therefore, the un-deployed airbags among the airbags 10-15 are reserved for a secondary collision of the vehicle VE1.

Even further, the airbag controller 9 operates only one of the right curtain airbag 13 or the left curtain airbag 14 when the level of the offset collision detected by the image process arithmetic unit 7 is less than the first preset value. In such manner, when the level of the offset collision is low and no big rotation of the vehicle VE1 is caused, the unnecessary operation/deployment of the airbags 10, 11, 12, 15 is prevented. On the other hand, when the level of the offset collision is equal to or greater than the first preset value and a big rotation of the vehicle VE1 is caused, there is concern over/about the collision of the occupant body against a right front pillar RP or a left front pillar LP or an instrument panel. Therefore, in such case, in addition to operating the right or the left curtain airbag 13, 14, at least one other airbag from among the airbags 10, 11, 12, or 15 is operated (i.e., an airbag other than the curtain airbags is operated). Therefore, the occupant of the vehicle is protected from a big rotation of the vehicle.

Also, the right windshield post airbag 10, the left windshield post airbag 11, the right curtain airbag 13, and the left curtain airbag 14 are disposed symmetrically in pairs on a right-side position and a left-side position in the vehicle compartment CV of the vehicle VE1. In addition, the level of the offset collision detected by the image process arithmetic unit 7 may in some case smaller than the second preset value. In such case, from among the right curtain airbag 13, and the left curtain airbag 14 and from among the right windshield post airbag 10 and the left windshield post airbag 11, the airbags disposed on an opposite side that is opposite in a right-left direction relative to the rotation of the vehicle VE1 is exclusively operated. In such manner, when the level of the offset collision is low and no big rotation is caused in the vehicle VE1, the airbags only on one side toward which the occupant is left unmoved due to inertia of him/herself are operated. Therefore, the collision of the occupant body against the right front pillar RP or the left front pillar LP or the like is prevented.

When, on the other hand, the level of the offset collision is equal to or greater than the second preset value and a big rotation is caused in the vehicle VE1, there is concern about the following situation, that is, the occupant is once left unmoved by the inertia, and then moved anyway/finally toward the rotation direction of the vehicle VE1 to collide with the right front pillar RP or the left front pillar LP or the like. Therefore, in such case, after operating the opposite-to-rotation side airbags 10, 11, 13, 14 first, the airbags 10, 11, 13, 14 disposed on the rotation side are also operated. Thus, the collision of the occupant with the right front pillar RP or the left front pillar LP or the like is prevented.

Further, the airbag controller 9 determines that a collision of the vehicle causes a level of rotation of the vehicle VE1 for which there is no need to operate the airbags 10-15 when the level of the offset collision detected by the image process arithmetic unit 7 is less than the third preset value. Further, one of the lateral threshold values LTH is a threshold value that is selected for a collision that does not require the operation of the airbags 10-15, i.e., the initial value LTH0. The initial value LTH0 has a greater-than-all-other value, i.e., the maximum value among the lateral threshold values. Such a threshold value LTH0 may be used as the lateral threshold value, for preventing the malfunction of the collision of the vehicle VE1 by the side-right acceleration sensor 4 or by the side-left acceleration sensor 5.

Other Embodiments

Although the present disclosure has been fully described in connection with preferred embodiment thereof with reference to the accompanying drawings, it is to be noted that various changes and modifications will become apparent to those skilled in the art.

For example, as a front-rear impact magnitude detector and as a right-left impact magnitude detector for detecting the magnitude of the impact that is applied from an outside to the vehicle VE1, a pressure sensor for detecting a chamber pressure that is disposed in a front bumper or in a door of the vehicle VE1 may also be used, in addition to or instead of the acceleration sensors 2-5, at a time of collision/accident. That is, a pressure increase of such chamber may be detected for the detection of the offset collision.

Also, at least one of the right windshield post airbag 10, the left windshield post airbag 11, the instrument panel airbag 12, the right curtain airbags 13, the left curtain airbags 14, and the far-side airbag 15 is required as an occupant protector, not necessarily all of them at the same time.

Further, by using a pre-tensioner seat belt as an occupant protector, the occupant may appropriately be protected by causing the tension of the seat belt when at least one of the detection values either from the front-right acceleration sensor 2, the front-left acceleration sensor 3, the side-right acceleration sensor 4, or the side left acceleration sensors 5 is equal to or greater than the lateral threshold value LTH.

Further, by using a sonar device, which replaces the in-vehicle camera 6, for projecting an ultrasonic wave towards the front field of the vehicle VE1 which serves as the offset level detector, the approach of the other vehicle VE2 may be detected in a non-contacting manner, i.e., before the vehicle VE1 actually collides with the other vehicle VE2. An infrared sensor and/or a radar device may also be used for such purposes.

When the detection value from the side-right acceleration sensor 4 or the side-left acceleration sensor 5 is equal to or greater than the lateral threshold value LTH irrespective of the detection values from the front-right acceleration sensor 2 and the front-left acceleration sensor 3, the deployment operation of the airbags 10-15 may be performed.

Additionally, not only the offset collision at the front part of the vehicle VE1 but also the rear-end collision in an offset manner as well as a collision with an electric pole or other type of objects in an offset manner may be detected by the device of the present disclosure.

Further, the setting method of the lateral threshold value LTH based on the threshold values of the relative speed, the offset rate, and the collision angle (i.e., 50% offset rate and 45 deg. collision angle, etc.) shown in FIGS. 9 to 14 is presented only as an example, and such method may arbitrarily be modified or changed based the experimental result or other factors.

Such changes, modifications, and summarized scheme are to be understood as being within the scope of the present disclosure as defined by appended claims.

What is claimed is:

1. A vehicle occupant protection device comprising:
    a front-rear impact magnitude detector detecting a magnitude of an impact of a vehicle along a front-rear direction of the vehicle;
    a right-left impact magnitude detector detecting a magnitude of an impact of the vehicle along a right-left direction of the vehicle;
    an occupant protector configured to protect a body of an occupant from impact with the vehicle;
    a protection controller operating the occupant protector when an over-threshold impact is detected by the front-rear impact magnitude detector or the right-left impact magnitude detector;
    a right-left threshold storage storing plural lateral thresholds for operating the occupant protector based on the magnitude of the impact detected by the right-left impact magnitude detector; and
    an offset level detector detecting a level of an offset collision when an obstacle collides with a front portion of the vehicle, wherein
    the protection controller selects one of the plural lateral thresholds stored in the right-left threshold storage based on the level of the offset collision detected by the offset level detector.

2. The vehicle occupant protection device of claim 1, wherein
    each of the plural lateral thresholds is a threshold used to detect rotation of the vehicle.

3. The vehicle occupant protection device of claim 1, wherein
    each of the plural lateral thresholds is a threshold used to detect rotation of the vehicle that is caused by a small overlap collision.

4. The vehicle occupant protection device of claim 1, wherein
    the protection controller selects one of the plural lateral thresholds stored in the right-left threshold storage based on the level of the offset collision which is derived from (i) an overlap ratio that is defined as an overlap amount between the vehicle and the obstacle in the offset collision divided by a width of the vehicle, and (ii) a relative speed of the vehicle relative to the obstacle.

5. The vehicle occupant protection device of claim 1, wherein
    the protection controller selects one of the plural lateral thresholds stored in the right-left threshold storage based on the level of the offset collision which is derived from (i) a colliding angle between the vehicle and the obstacle, and (ii) a relative speed of the vehicle relative to the obstacle.

6. The vehicle occupant protection device of claim 1, wherein
    the protection controller operates the occupant protector when both the front-rear impact magnitude detector and the right-left impact magnitude detector detect an over-threshold impact.

7. The vehicle occupant protection device of claim 1, wherein
    the protection controller selects one of the plural lateral thresholds stored in the right-left threshold storage based on the level of the offset collision detected by the offset level detector, the detection of the level of the offset collision being detected at a prior-to-collision timing, the prior-to-collision timing being defined as a time prior to the collision of the vehicle with the obstacle.

8. The vehicle occupant protection device of claim 7, wherein
    the protection controller invalidates a collision start determination when the level of the offset collision detected by the offset level detector indicates that the vehicle is not involved in a collision, and
    the protection controller prohibits selecting one of the plural lateral thresholds based on the level of the offset collision detected by the offset level detector.

9. The vehicle occupant protection device of claim 1, wherein
    the offset level detector includes an obstacle detector disposed in the vehicle and that detects an approach of the obstacle toward the vehicle while the obstacle is in a non-contact state with the vehicle.

10. The vehicle occupant protection device of claim 1, wherein
    the occupant protector includes plural airbags, and
    the protection controller selects and operates one or more of the plural airbags based on the level of the offset collision detected by the offset level detector.

11. The vehicle occupant protection device of claim 10, wherein
    the airbags include curtain airbags,
    the protection controller operates the curtain airbags only when the level of the offset collision detected by the offset level detector is less than a first preset value, and
    the protection controller operates at least one other airbag in addition to the curtain airbags when the level of the offset collision detected by the offset level detector is equal to or greater than the first preset value.

12. The vehicle occupant protection device of claim 10, wherein
    the airbags are disposed symmetrically in pairs on a right-side position and a left-side position in a vehicle compartment,
    the protection controller operates the airbags that are disposed on a side opposite to a rotation direction of the vehicle along a right-left direction, when the level of the offset collision detected by the offset level detector is less than a second preset value, and
    the protection controller operates the airbags that are disposed on the side opposite to the rotation direction of the vehicle along the right-left direction, and subsequently operates the airbags that are disposed on a side of the rotation direction of the vehicle when the level of the offset collision detected by the offset level detector is equal to or greater than the second preset value.

13. The vehicle occupant protection device of claim 1, wherein the protection controller determines that a collision of the vehicle has a level of rotation for which operation of the occupant protector is not needed when the level of the offset collision detected by the offset level detector is less than a third preset value, an initial value is configured as one of the lateral thresholds that is selected when the protection controller determines that the collision of the vehicle has the level of rotation for which operation of the occupant protector is not needed, and the initial value is set to a greater value that is greater than all other lateral thresholds.

* * * * *